United States Patent
Kleindorfer et al.

(10) Patent No.: US 9,611,896 B2
(45) Date of Patent: Apr. 4, 2017

(54) ELASTIC FORCE TRANSMISSION ELEMENT AND COUPLING DEVICE

(71) Applicant: SÜDDEUTSCHE GELENKSCHEIBENFABRIK GMBH & CO. KG, Waldkraiburg (DE)

(72) Inventors: Klaus Kleindorfer, Kraiburg am Inn (DE); Marc Brandl, Burgkirchen (DE); Johann Loew, Peterskirchen (DE); Josef Stubenrauch, Rott (DE); Armin Huber, Schoenberg (DE)

(73) Assignee: SÜDDEUTSCHE GELENKSCHEIBENFABRIK GMBH & CO. KG, Waldkraiburg (DE)

( * ) Notice: Subject to any disclaimer, the term of this patent is extended or adjusted under 35 U.S.C. 154(b) by 0 days.

(21) Appl. No.: 14/362,094

(22) PCT Filed: Nov. 30, 2012

(86) PCT No.: PCT/EP2012/074042
§ 371 (c)(1),
(2) Date: May 30, 2014

(87) PCT Pub. No.: WO2013/079640
PCT Pub. Date: Jun. 6, 2013

(65) Prior Publication Data
US 2014/0378234 A1    Dec. 25, 2014

(30) Foreign Application Priority Data

Dec. 1, 2011  (DE) .................... 10 2011 119 936

(51) Int. Cl.
*F16D 3/62* (2006.01)
*F16D 3/78* (2006.01)

(52) U.S. Cl.
CPC  *F16D 3/62* (2013.01); *F16D 3/78* (2013.01)

(58) Field of Classification Search
CPC .................................... F16D 3/62; F16D 3/78
(Continued)

(56) References Cited

U.S. PATENT DOCUMENTS

| 4,031,714 A * | 6/1977 | Faust ..................... F16D 3/62 |
| | | 464/69 |
| 2001/0011038 A1 | 8/2001 | Albers | |

FOREIGN PATENT DOCUMENTS

| AT | 101387 B | 10/1925 |
| DE | 1021212 B | 12/1957 |

(Continued)

OTHER PUBLICATIONS

English translation of International Search Report of International Application No. PCT/EP2012/07402; mail date of Jan. 18, 2013; 3 pages.

*Primary Examiner* — Gregory Binda
(74) *Attorney, Agent, or Firm* — Moore & Van Allen PLLC; Henry B. Ward, III

(57) ABSTRACT

An elastic force transmission device 10 is provided, in particular for transmitting torques, wherein the force transmission element 10 is provided with at least two receiving openings 14, 16 for connection to force transmission components, an elastomer body 12 and at least one loop assembly 26 embedded in the elastomer body 12, wherein the loop assembly has at least two opposite strands 42, 44 and the force transmission element 10 has at least one pressure absorption device 28, 30, 36, 38. According to the invention, it is provided that the at least one pressure absorption device 28, 30, 36, 38 is arranged in a region between the opposite strands 42, 44 of the loop assembly 26, in which region the opposite strands 42, 44 of the loop assembly 26 are at the maximum distance A from each other, wherein the at least one pressure absorption device 28, 30, 36, 38 is designed in (Continued)

such a manner that the rigidity of the force transmission element 10 progressively increases in the event of a tensile loading.

17 Claims, 25 Drawing Sheets

(58) Field of Classification Search
USPC .......................................................... 464/69
See application file for complete search history.

(56) References Cited

FOREIGN PATENT DOCUMENTS

| | | | |
|---|---|---|---|
| DE | 19831265 A1 | | 1/2000 |
| GB | 211272 A | | 2/1924 |
| GB | 339560 A | | 12/1930 |
| GB | 2082716 A | | 3/1982 |
| JP | 62-292924 A | * | 12/1987 |
| JP | 3-229018 A | * | 10/1991 |

* cited by examiner

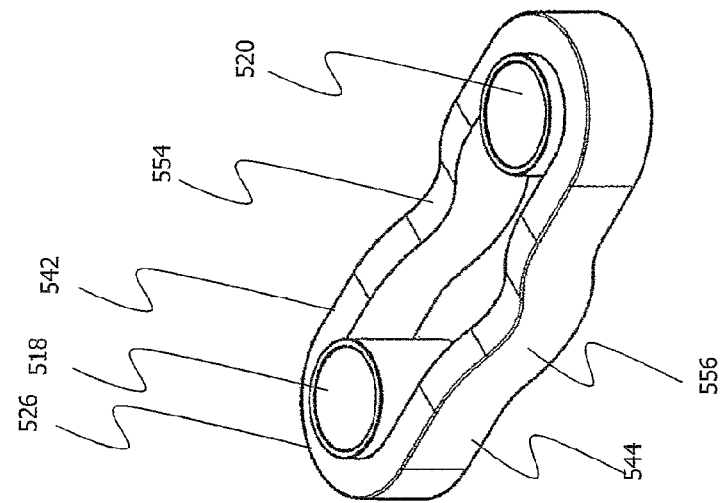
Fig. 15c
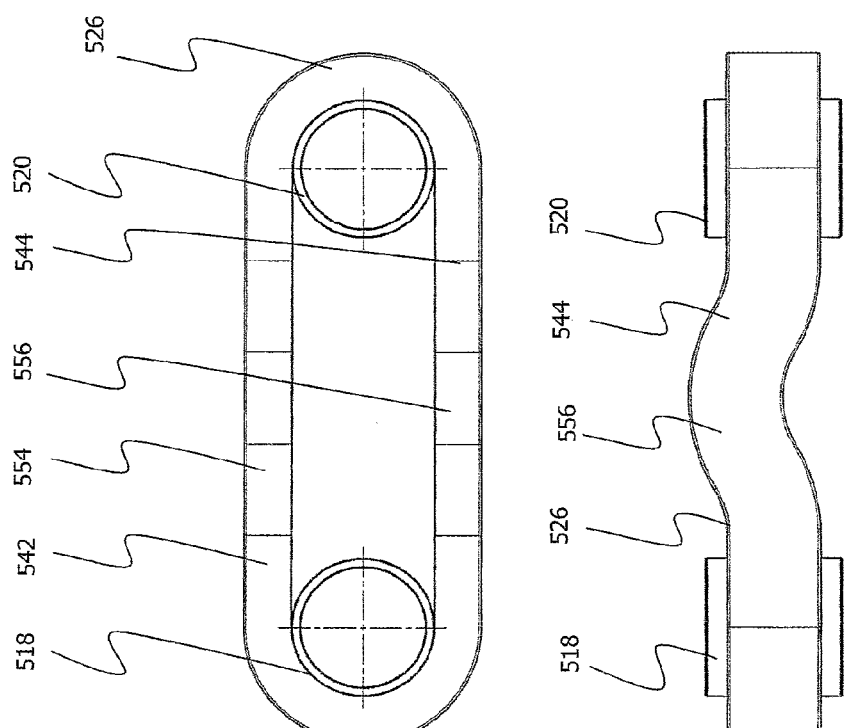
Fig. 15a
Fig. 15b

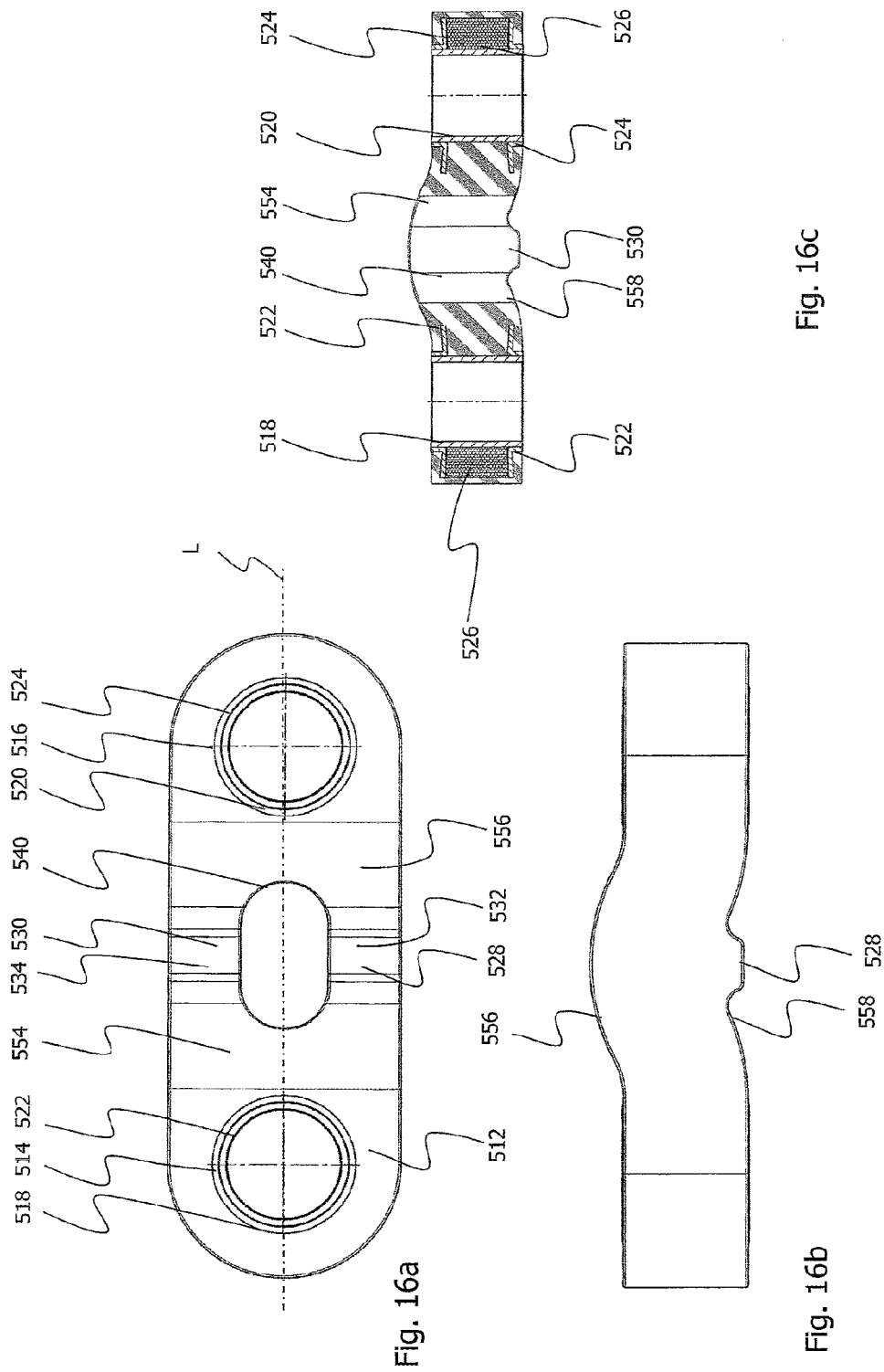

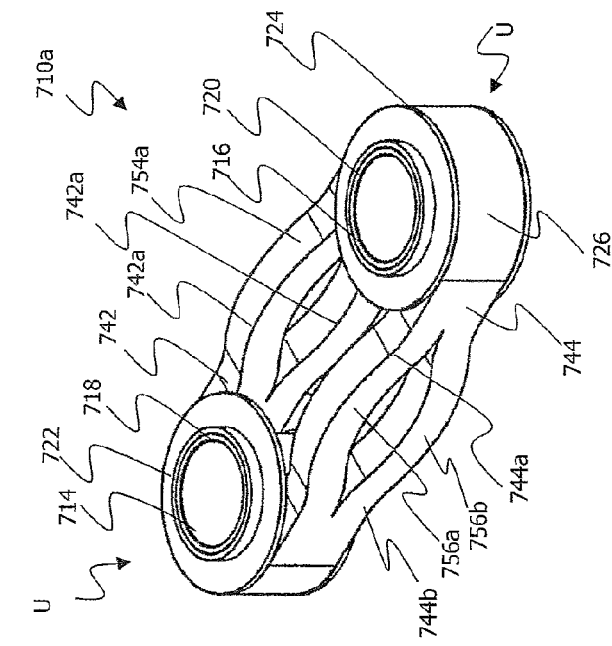
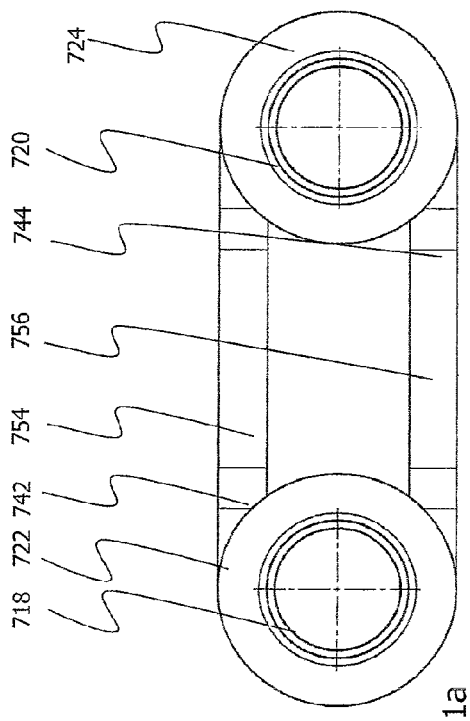
Fig. 21a
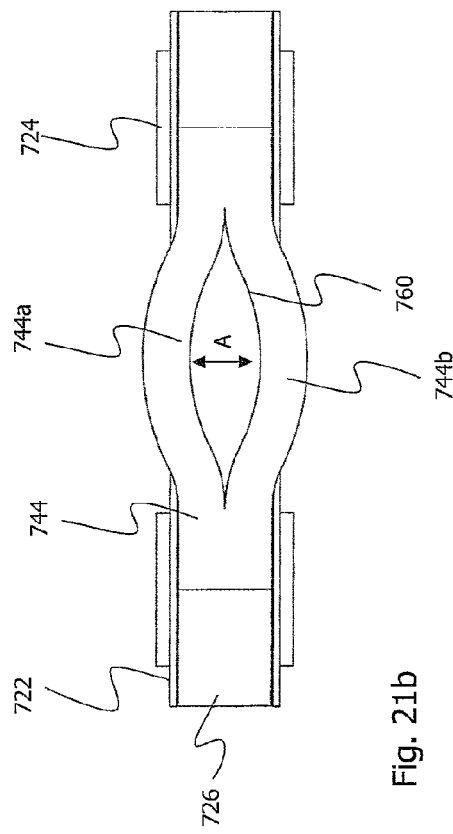
Fig. 21b
Fig. 21c

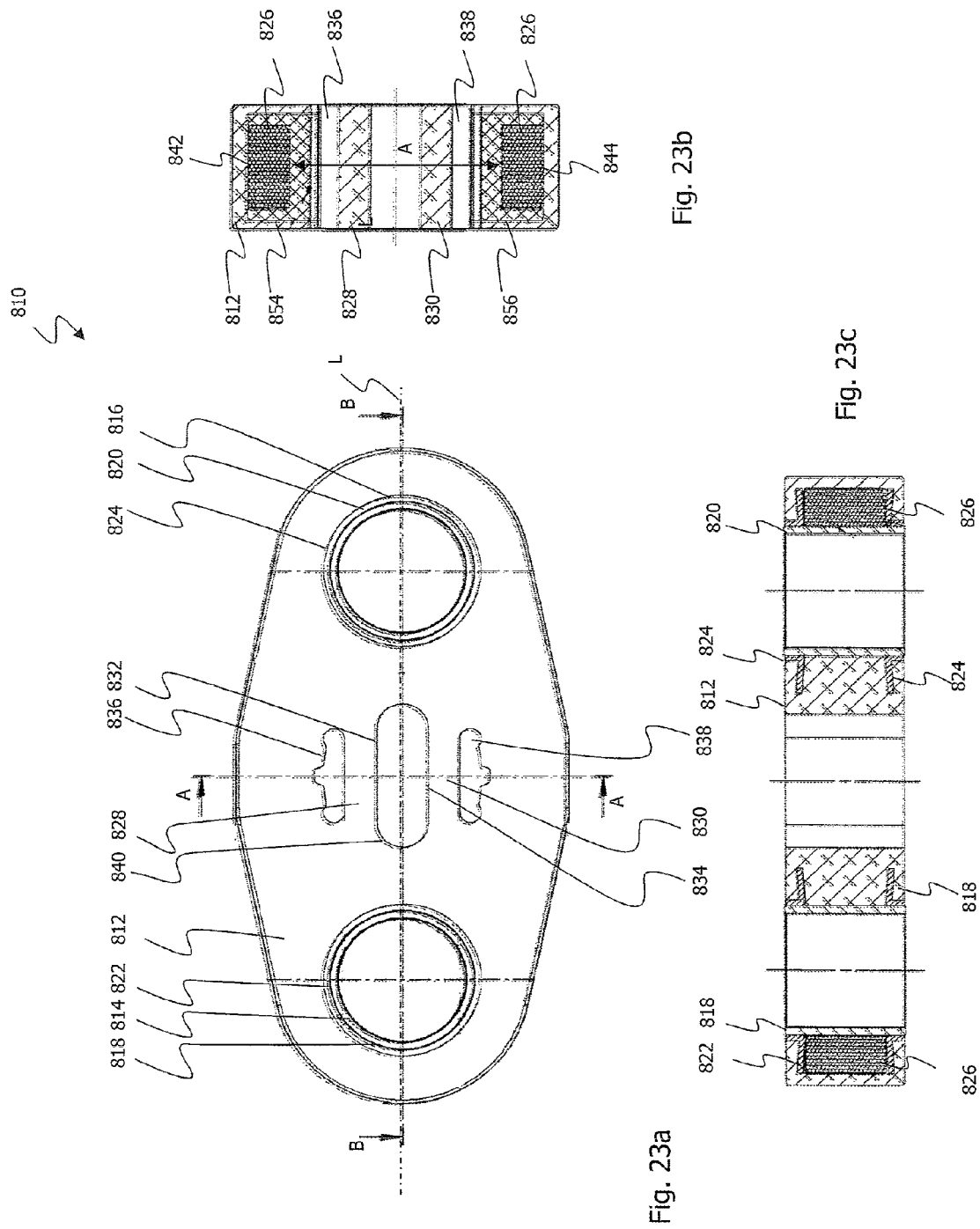

ELASTIC FORCE TRANSMISSION ELEMENT AND COUPLING DEVICE

FIELD OF THE INVENTION

The present invention relates to an elastic force transmission element, in particular for transmitting torques.

BACKGROUND OF THE INVENTION

Force transmission elements of this kind are known from the prior art and disclosed, for example, in the document AT 101387.

BRIEF SUMMARY OF THE INVENTION

This document discloses a coupling element having a pressure body. The pressure body has an elliptical shape and semicircular cutouts, into which spool-like bushes are inserted. The pressure body and the bushes are wrapped by a plurality of windings of a tension member. Subsequently, the described arrangement is coated with a rubber solution and vulcanised.

The relatively high rigidity, irrespective of the loading of the coupling element, of the coupling elements known from the prior art has proved to be disadvantageous for the force transmission and also for the vibration damping behaviour.

In contrast, an object of the present invention is to provide an elastic force transmission element of the kind referred to at the outset which enables the setting of a desired rigidity as a function of the loading and at the same time a long service life.

This object is achieved by elastic force transmission element having the features according to the present application. In one embodiment, an elastic force transmission element, in particular for transmitting torques, is provided having at least two bushings for connection to at least two force transmission components. The elastic force transmission element includes at least one loop assembly that is embedded in an elastomer mass and has in the region between the at least two bushings at least two opposite, freely elastically deformable strands, each of the at least two opposite strands of the at least one loop assembly being formed in the region between the at least two bushings with at least one predetermined deformation. In the event of a tensile loading the at least one predetermined deformation of the at least two opposite strands is elastically deformable in such a manner that the rigidity of the force transmission element progressively increases in the event of a tensile loading. The at least one loop assembly is held in a predetermined axial position on one of the bushings via at least two collar bushings, and the bushings and the collar bushings being embedded at least partly in the elastomer mass. The at least one predetermined deformation comprising a kink with a predetermined kink angle, and the opposite strands, surrounded with the elastomer mass, defining a cutout between them in the region between the bushings, and the rigidity of the force transmission element being determined by the elastomer mass and the kinks of the strands.

In one embodiment, the at least two opposite strands have at least one deformation such that, starting from one of the bushings, respectively, the distance between the strands of the loop assembly changes until a predetermined distance between the strands is set in one region.

In another embodiment, the maximum distance between the opposite strands of the at least one loop assembly is in the region of the predetermined distance.

In another embodiment, the minimum distance between the strands of the loop assembly is in the region of the predetermined distance.

In another embodiment, in a region of the predetermined deformation, in which at least two strands of the at least one loop assembly are at a maximum distance from each other, at least one pressure absorption device is arranged, the at least one pressure absorption device being designed in such a manner that the rigidity of the force transmission element progressively increases in the event of a tensile loading.

In another embodiment, the at least one pressure absorption device has at least one pressure element which extends, at least in portions, transversely to the longitudinal axis of the force transmission element.

In another embodiment, the at least one pressure absorption device comprises at least one opening in the elastomer body, which opening is arranged between the at least one pressure element and at least one of the two strands of the loop assembly.

In another embodiment, the at least two opposite strands in the region between the two bushings are, at least one location, at a distance from each other which is greater than the diameter of the bushings.

In another embodiment, the pressure absorption device has at least two pressure elements which bear against each other in the event of a tensile loading of the force transmission element.

In another embodiment, the at least one pressure element is formed integrally with the elastomer body of the force transmission element.

In another embodiment, the elastic force transmission element has at least two loop assemblies, the at least two loop assemblies being arranged and provided with a predetermined deformation in such a manner that the maximum distance between the strands of the one loop assembly and the strands of the other loop assembly is set in the axial direction of the bushings.

In another embodiment, the opposite strands of the at least two loop assemblies are provided in each case with a predetermined deformation in the axial direction of the bushings, the strands of the one loop assembly being deformed in a predetermined manner axially in the opposite direction to the strands of the respectively other loop assembly.

In another embodiment, the at least two opposite strands of the at least one loop assembly have in the region between the bushings in each case two sub-strands, the sub-strands being deformed oppositely to each other in the axial direction of the bushings.

In another embodiment, the Elastic force transmission device has at least two of the force transmission elements.

According to another embodiment, a coupling device is provided for transmitting torques between two shaft portions, having a first flange, and a second flange, the first and the second flange each having a plurality of fastening elements and a fastening element of the first flange and a fastening element of the second flange being connected to each other via in each case at least one force transmission element. In one embodiment, the first and/or the second flange have cutouts, into which the fastening elements of the respectively other flange project.

In another embodiment, a coupling device is provided for transmitting torques between two shaft portions, having a first flange, and a second flange, the first and the second flange each having a plurality of fastening elements and a fastening element of the first flange and a fastening element of the second flange being connected to each other via in each case at least one force transmission element.

Preferred embodiments of the force transmission element according to the invention emerge in each case from the dependent claims.

The elastic force transmission element according to the invention comprises at least two bushings for connection to at least two force transmission components and at least one loop assembly which is embedded in an elastomer mass and has in the region between the at least two bushings at least two opposite, elastically deformable strands. The at least two opposite strands of the at least one loop assembly are formed in the region between the at least two bushings in each case with at least one predetermined deformation. In the event of a tensile loading the at least one predetermined deformation of the at least two opposite strands is elastically deformable in such a manner that the rigidity of the force transmission element progressively increases in the event of a tensile loading.

In the event of a tensile loading of the force transmission element according to the invention, the bushings are moved away from each other, whereby the at least one loop assembly or the strands of the at least one loop assembly are stretched and the predetermined deformation is elastically deformed. The stretching of the strands due to tensile load generates a compressive force acting transversely to the longitudinal axis of the force transmission element. The strands of the loop assembly can absorb this compressive force via an elastic deformation of the predetermined deformation, whereby the rigidity of the force transmission element progressively increases in the event of a tensile loading.

The expression "elastically deformable", which is used with reference to the opposite strands of the at least one loop assembly, is to be understood as meaning that the opposite strands embedded in the rubber mass are elastically deformed until the opposite strands assume a substantially stretched state owing to the transverse forces acting on them. The transverse forces tend to zero in the stretched state of the strands of the at least one loop assembly, whereby a rigidity characteristic for the force transmission element with a soft zero crossing is achieved, i.e. the rigidity of the force transmission device progressively increases.

In other words, the rigidity of the force transmission element progressively rises, the closer the strands of the at least one loop assembly come to their stretched state, i.e. the smaller the predetermined deformation of the strands of the loop assembly becomes. In the stretched state of the strands of the at least one loop assembly, the rigidity of the force transmission element is at the maximum.

According to one embodiment of the present invention, the at least two opposite strands of at least one loop assembly have in each case a predetermined deformation such that, in each case starting from one of the bushings, the distance between the opposite strands of the loop assembly changes until a predetermined distance between the strands of the loop assembly is set in one region. In this embodiment, the rigidity increases until the opposite strands of the at least one loop assembly in their stretched state are at a substantially constant distance from each other, i.e. are parallel to each other. Put another way, the transverse forces which occur in the case of substantially parallel-running strands of the loop assembly tend to zero.

According to the invention, the maximum distance between the opposite strands of the loop assembly is in the region of the predetermined distance.

Alternatively, it can be provided that the minimum distance between the opposite strands of the loop assembly is in the region of the predetermined distance.

According to one embodiment of the invention, in a region of the predetermined deformation, in which the opposite strands of the loop assembly are at the maximum distance from each other, at least one pressure absorption device is arranged, the at least one pressure absorption device being designed in such a manner that the rigidity of the force transmission element progressively increases in the event of a tensile loading.

In this embodiment, a pressure absorption device is provided in order to absorb, in addition to the strands themselves, the transverse or compressive forces acting on the strands of the loop assembly, i.e. the strands transmit the compressive or transverse forces acting on them at least partly to the pressure absorption device.

In the event of a tensile loading of the force transmission element, the pressure absorption device absorbs a compressive force exerted by the strands of the at least one loop assembly in such a manner that the rigidity of the force transmission element or the rigidity of the at least one loop assembly further progressively increases. Through the arrangement of the pressure absorption device between strands of the at least one loop assembly, the pressure absorption device can absorb the resulting transverse forces or compressive forces and thus further increase the rigidity of the force transmission element. The rigidity of the force transmission element in the event of loading is initially determined only by the at least one loop assembly and the elastomer body surrounding the latter. In the event of rising tensile loading, the compressive force generated is absorbed by the pressure absorption device, thereby resulting in the progressively rising rigidity. In other words, the force transmission element initially has a low rigidity, the rigidity progressively increasing in the event of rising loading. Particularly in the event of a torque rise exerted abruptly on the force transmission element, such as e.g. on starting a machine, the loop assemblies are greatly stretched. This abruptly occurring stretching or loading of the loop assemblies can be counteracted with the aid of the pressure absorption device, since the pressure absorption device absorbs the transverse or compressive force occurring due to the stretching of the loop assemblies.

According to one preferred embodiment of the invention, it is provided that the at least one pressure absorption device has at least one pressure element which extends, at least in portions, transversely to the longitudinal axis of the force transmission element in at least one cutout. The pressure element absorbs the compressive force generated by the strands after a predetermined approach of the strands to each other. As a result, the rigidity of the force transmission element according to the invention further increases after the predetermined approach mentioned.

The at least one pressure absorption device preferably comprises at least one opening in the elastomer body, which opening is arranged between the at least pressure element and at least one of the strands of the loop assembly. Through the opening of the pressure absorption device, the elastomer body of the force transmission element can be deformed in the region of these openings to progressively increase the rigidity, before the at least one pressure element is loaded. Bushings can be provided in the openings of the pressure absorption device. These bushings are preferably made of plastic.

The shape of the loop assembly also helps to set a progressively rising rigidity. According to the invention, it is provided that the two opposite strands in the region between the two bushings are, at at least one location, at a distance from each other which is greater than the diameter of the bushings. Put another way, this means that the at least one loop assembly surrounds the two bushings of the force transmission element and the distance between the two strands of the at least one loop assembly increases starting from one bushing up to the location with the maximum distance. Starting from the location of the maximum distance between the two opposite strands of the loop assembly, the distance between the strands decreases in the direction of the respectively opposite bushing.

According to one preferred embodiment of the invention, the pressure absorption device has at least two pressure elements which move towards each other and finally bear against each other in the event of a tensile loading, owing to the compressive force exerted by the at least one loop assembly. In this embodiment of the invention, the rigidity rises in discrete steps, since in the event of a tensile loading the rigidity of the force transmission element is initially determined only by the rigidity of the at least one loop assembly and of the elastomer body surrounding the latter, until the two pressure elements come to bear against each other and absorb the compressive force generated by the loop assembly or its strands, whereby the rigidity is progressively increased in discrete steps.

In order to be able to produce the force transmission element according to the invention relatively simply and cost-effectively, the at least one pressure element is preferably formed integrally with the elastomer body of the force transmission element.

According to one embodiment of the present invention, the elastic force transmission element can have at least two loop assemblies, the at least two loop assemblies being arranged and provided with a predetermined deformation in such a manner that the maximum distance between the strands of the one loop assembly and the strands of the other loop assembly is set in the axial direction of the bushings.

Preferably, the strands of the at least two loop assemblies can be provided in each case with a predetermined deformation in the axial direction of the bushings, the opposite strands of the one loop assembly being deformed in a predetermined manner in the opposite direction to the opposite strands of the respectively other loop assembly.

According to one embodiment of the invention, the at least two opposite strands of the at least one loop assembly have in the region between the bushings in each case two sub-strands, the sub-strands being deformed in a predetermined manner oppositely to each other in the axial direction of the bushings. In other words, the strands of the loop assembly are divided in the region between the bushings. Owing to this division, the sub-strands of the loop assembly can be provided individually with a predetermined deformation. The sub-strands here are deformed in such a manner that a predetermined distance is set between the sub-strands of a strand of the loop assembly.

According to one embodiment of the invention, the predetermined deformation is at least one kink with a predetermined kink angle. The kink angle lies, for example, in the range from 10°-20°.

Alternatively, the predetermined deformation can be a curvature or an arching.

In order to be able to hold the at least one loop assembly in a predetermined position on one of the bushings, at least two collar bushings are provided on one bushing.

Preferably, a loop assembly produced beforehand is used, which is subsequently brought together with the bushings and collar bushings to form a unit. The elastic force transmission element can thus be assembled in modular fashion. Besides the loop assembly embedded in the rubber mass, the collar bushings can also be covered, at least partly, with the rubber mass.

The present invention also relates to an elastic force transmission device having at least two of the force transmission elements described above.

The present invention further relates to a coupling device for transmitting torques between two shaft portions having a first flange and a second flange, the first and the second flange each having a plurality of fastening elements and a fastening element of the first flange and a fastening element of the second flange being connected to each other via in each case a force transmission element of the kind described above.

With a coupling of this kind, two shaft portions can be connected to each other and at the same time cardanic loads, i.e. angular offsets between the shaft portions to be connected, can be compensated. Couplings of this kind are suitable, for example, for use in motor vehicles, but also for industrial use.

According to one preferred embodiment of the invention, the first and/or the second flange have cutouts, into which the fastening elements of the respectively other flange project.

The invention is explained below by way of example with the aid of the accompanying figures, in which:

BRIEF SUMMARY OF THE SEVERAL VIEWS OF THE DRAWINGS

FIGS. 15a to 15c show views of the bushings, and of the loop assembly looping around the bushings, of the force transmission element according to the sixth embodiment of the invention;

FIGS. 16a to 16c show views of the force transmission element according to the sixth embodiment of the invention;

FIGS. 21a to 21c show views of the bushings, and of the loop assembly looping around the bushings, of the force transmission element according to the eighth embodiment of the invention;

FIGS. 23a to 23c show views of the force transmission element according to a ninth embodiment of the invention;

DETAILED DESCRIPTION OF THE INVENTION

Figure 1:
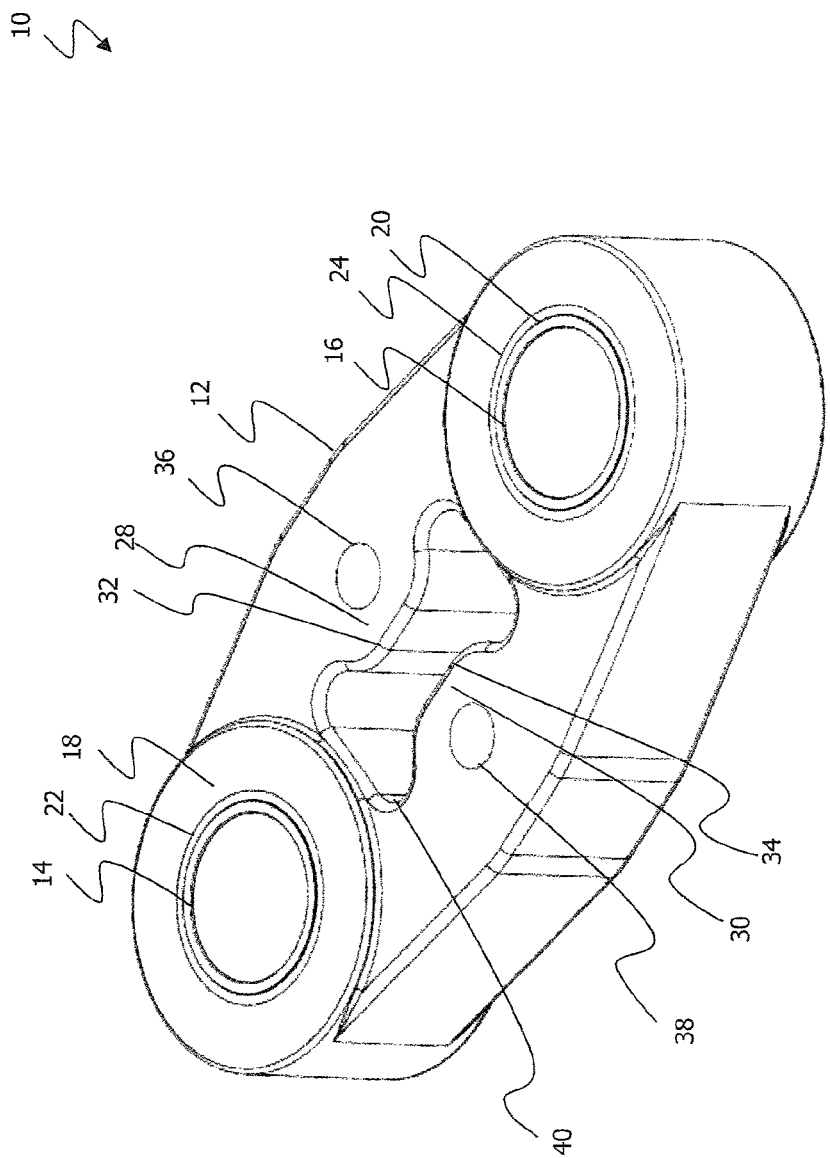
FIG. 1 shows a perspective view of a first embodiment of the present invention.

FIG. 1 shows a perspective view of the force transmission element according to a first embodiment of the invention, the force transmission element being designated generally by 10.

Figure 6:
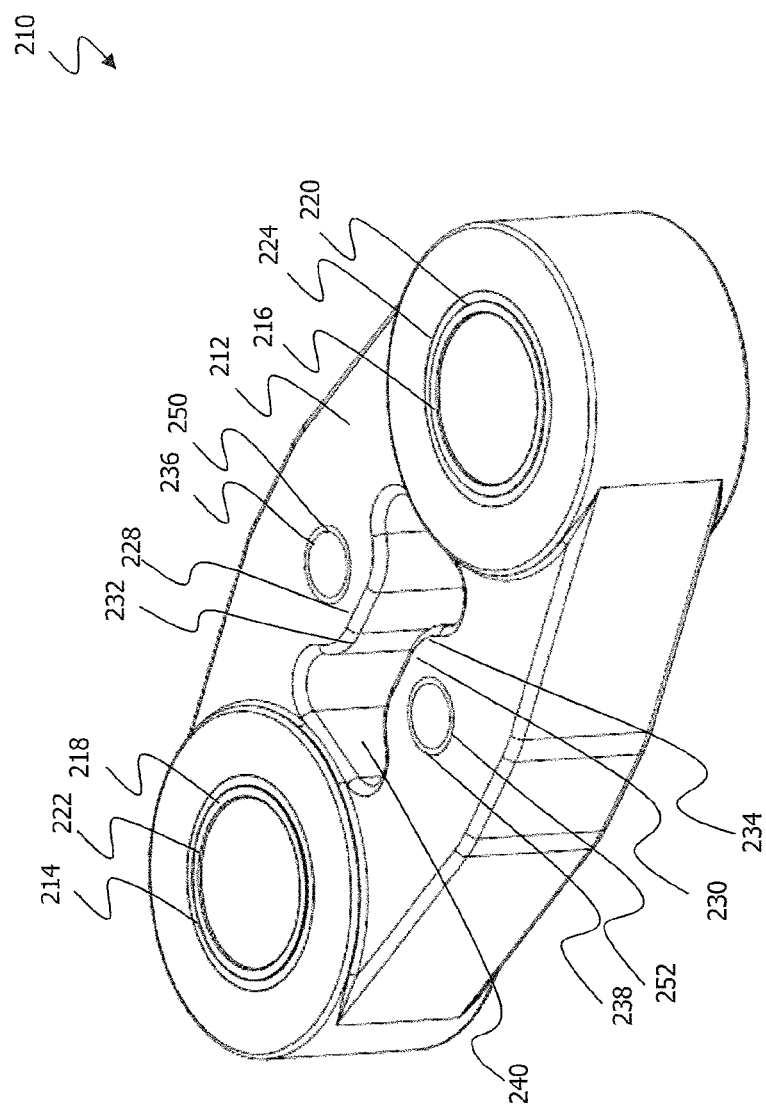
FIG. 6 shows a perspective view of a force transmission element according to a third embodiment of the invention.
Figure 7:
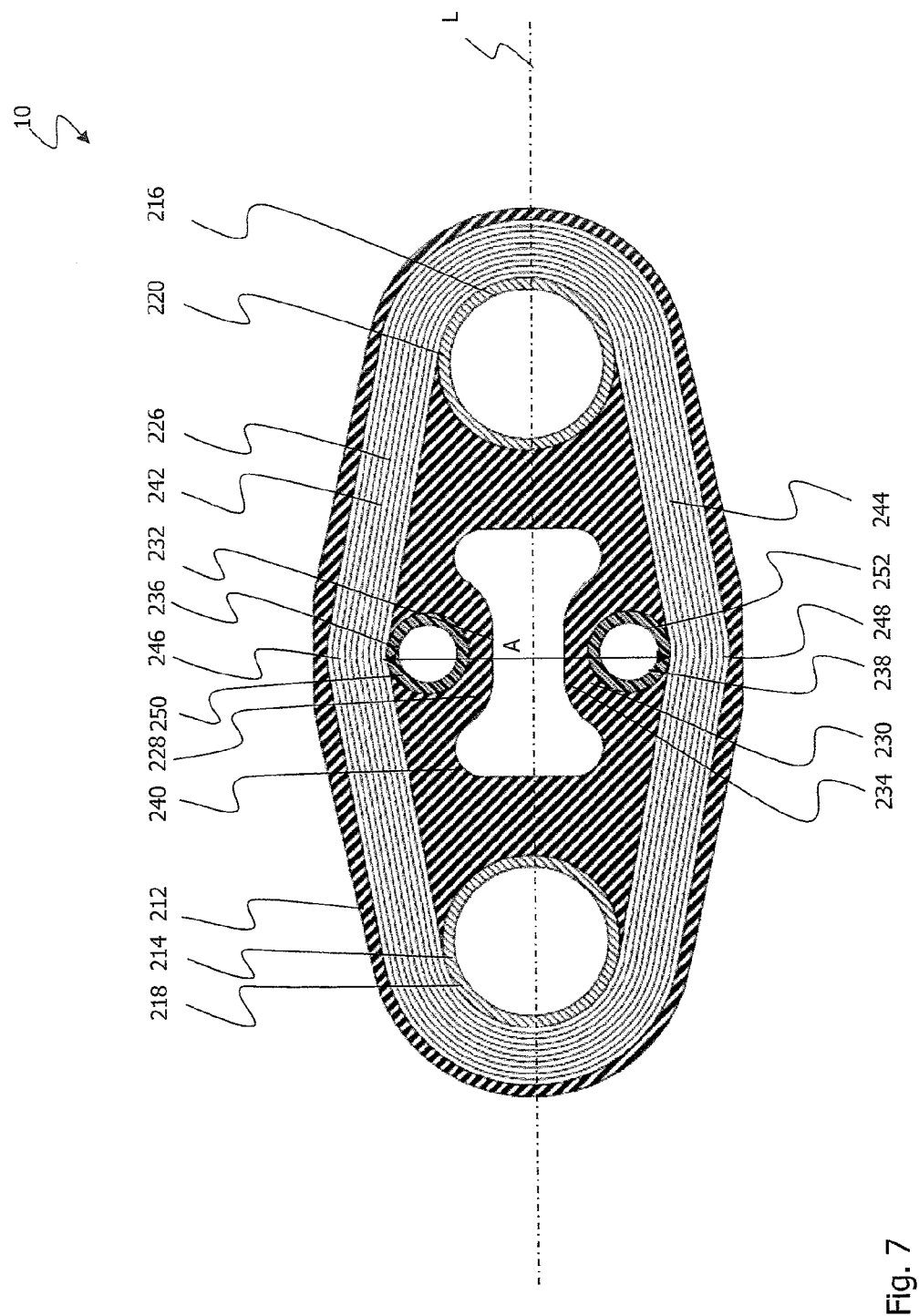
FIG. 7 shows a sectional view of the force transmission element according to the third embodiment of the invention.
Figure 8:
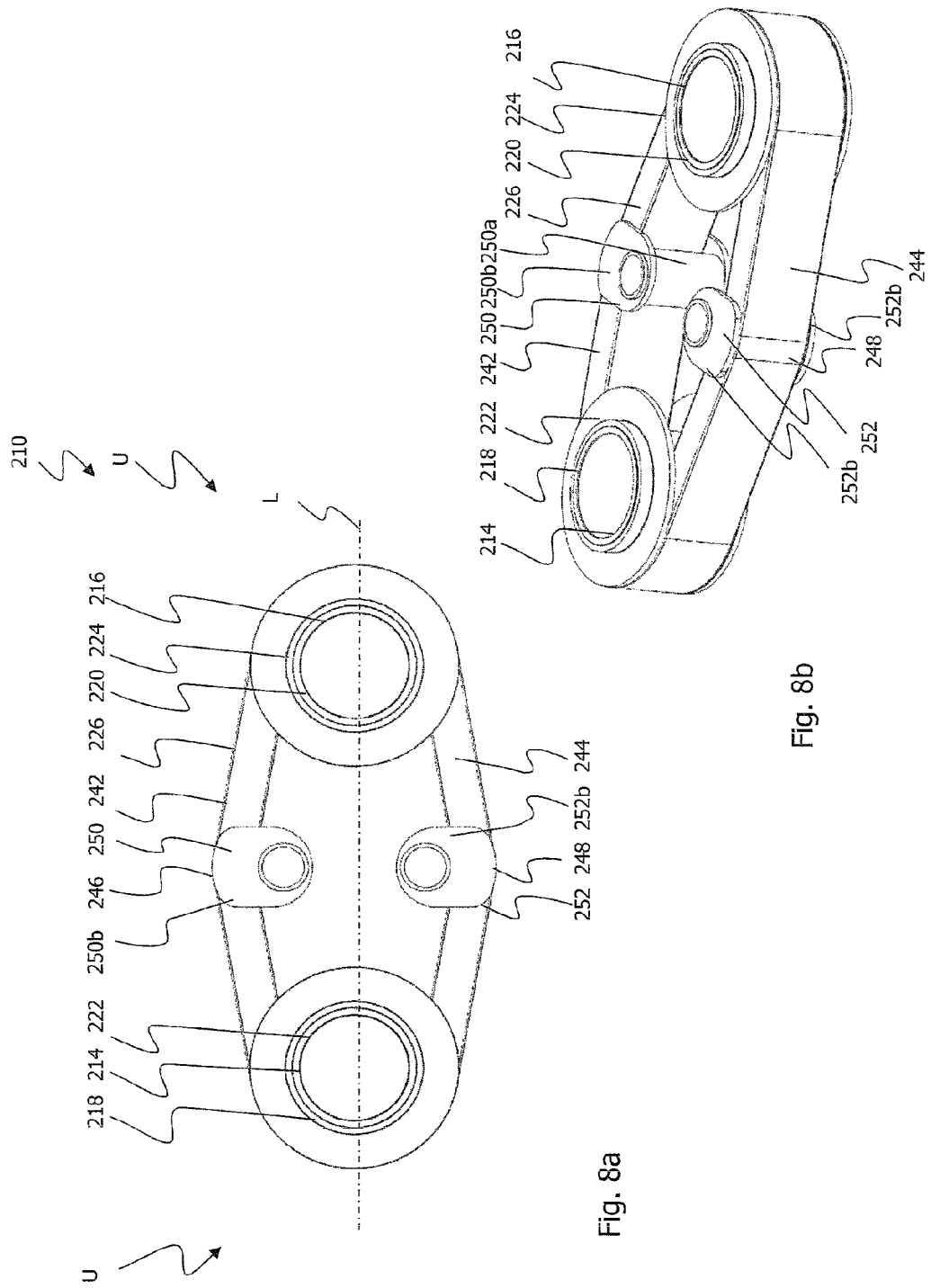
FIGS. 8a and 8b show a plan view and a perspective view of the bushings, and of the loop assembly looping around the bushings, of the force transmission element according to the third embodiment of the invention.

The force transmission element 10 has an elastomer body 12, in which receiving openings 14 and 16 are formed. In the receiving openings 14 and 16 there are provided bushings 18, 20, via which the force transmission element 10 can be coupled to force transmission components (see FIG. 6), between which forces are to be transmitted by means of the force transmission element 10.

In FIG. 1 there can be seen in outline collar bushings 22, 24 which are provided at the axial ends of the bushings 18, 20 and serve for supporting a loop assembly 26 (FIG. 2) in the axial direction of the bushings 18, 20. The bushings 18, 20 have looped around them a loop assembly 26 (FIG. 2), not shown in FIG. 1. The bushings 18, 20, the collar bushings 22, 24 and the loop assembly 26 (FIG. 2) are embedded in the elastomer body 12.

In the region between the receiving openings 14, 16 there can be seen pressure elements 28, 30 which are spaced apart from each other and which each have a bearing surface 32, 34, as well as openings 36, 38 in the elastomer body 12. The pressure elements 28, 30 and the openings 36, 38 form a pressure absorption device, by means of which the rigidity of the force transmission element 10 can be progressively increased in the event of a tensile loading.

The pressure elements 28, 30 lie opposite each other and in the event of a tensile loading of the force transmission element 10 approach each other owing to the stretching of the loop assembly 26 (FIG. 2), until the bearing surfaces 32, 34 come to bear against each other. The openings 36, 38 extend through the elastomer body 12 and are formed adjacent to the pressure elements 28, 30. The pressure elements 28, 30 project into a cutout 40 in the elastomer body 12, the cutout 40 being situated centrally in the elastomer body 12 between the receiving openings 14 and 16.

Figures 2A, 2B:
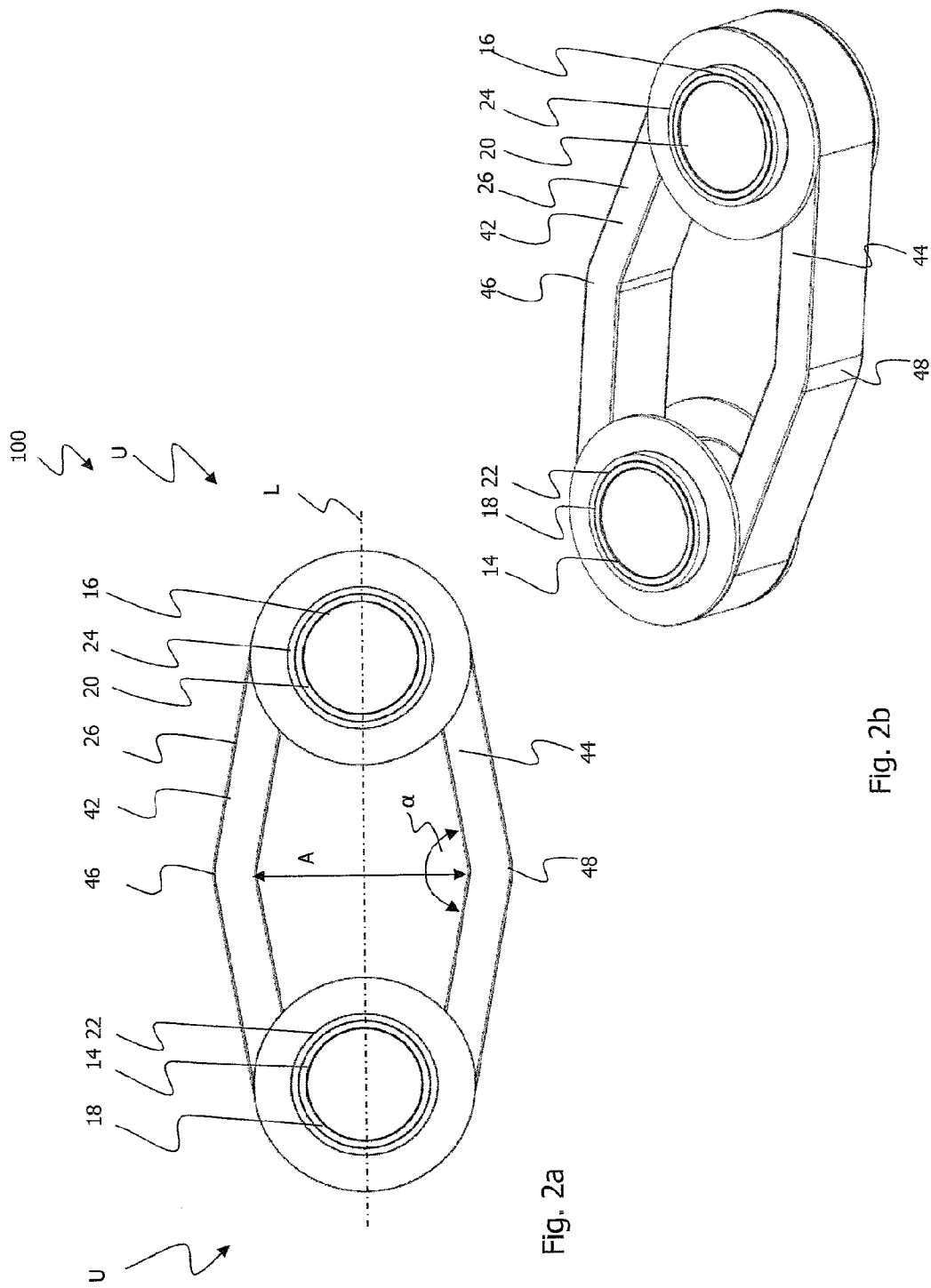
FIGS. 2a and 2b show a plan view and a perspective view of the bushings, and of the loop assembly looping around the bushings, of the force transmission element according to the invention.

FIG. 2a shows a plan view and FIG. 2b shows a perspective view, in which only the bushings 18, 20, the collar bushings 22, 24 arranged thereon, as well as the loop assembly 26 looping around the bushings 18, 20 in the looping region U are illustrated.

In the looping region U of the bushings 18, 20, the loop assembly 26 is supported by the collar bushings 22, 24 at the respective axial end of the bushings 18, 20 in the axial direction of the bushings 18, 20, in order to be able to prevent an axial "creep" of the loop assembly 26 on the bushings 18, 20 in the event of loading of the force transmission element 10.

In the region between the bushings 18, 20, the loop assembly 26 has opposite strands 42, 44. The strands 42, 44 of the loop assembly 26 are spaced apart by a distance from each other in a direction transversely to the longitudinal axis L of the force transmission element 10. The strands 42, 44 of the loop assembly 26 have a predetermined deformation in the form of a kink 46, 48. Starting from the bushings 18, 20, the distance between the strands 42, 44 increases up to the kink 46, 48 of the strands 42, 44. Starting from the kink 46, 48 of the associated strand 42, 44, the distance between the strands 42, 44 decreases again in the direction of the respectively other bushing 18, 20. In other words, the distance A between the strands 42, 44 at the kinks 46 and 48 and thus in the region of the predetermined deformation is at the maximum. The kinks 46, 48 of the strands 42, 44 are designed with a predetermined kink angle $\alpha$ of approx. 18°.

The first embodiment of the invention constitutes so to speak the "basic framework" for most of the further embodiments of the force transmission element according to the invention described here.

Figure 3:
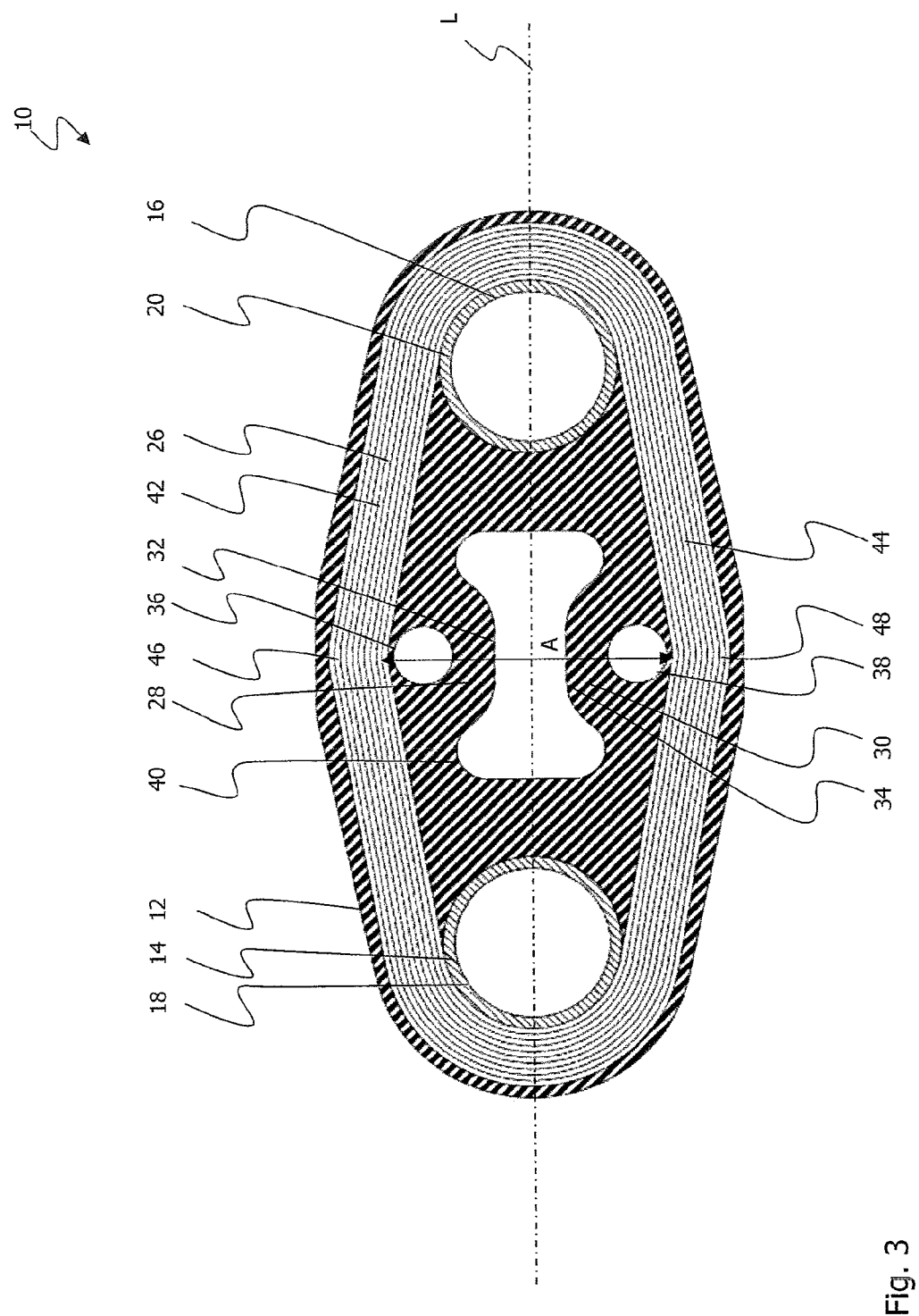
FIG. 3 shows a sectional view of the force transmission element according to the first embodiment of the invention.

FIG. 3 shows a sectional view of the force transmission element 10 according to the first embodiment of the invention.

In FIG. 3 there can again be seen the receiving openings 14, 16 with the bushings 18, 20 arranged therein and the collar bushings 22, 24 arranged at the axial ends of the bushings 18, 20. The bushings 18, 20 here have looped around them the loop assembly 26 illustrated in FIG. 3 by the dashed line. The cutout 40 as well as the pressure elements 28, 30 formed therein are provided in a region of the elastomer body 12 which lies both between the receiving openings 14, 16 and between the strands 42, 44 of the loop assembly 26. The openings 36, 38 extending through the elastomer body 12 are provided between the kink 46, 48 of the respective strand 42, 44 and one of the pressure elements 28, 30. In the region of the maximum distance A between the strands 42, 44, the pressure elements 28, 30, the openings 36, 38 and the kinks 44, 46 lie on an imaginary line running transversely to the longitudinal axis L of the force transmission element 10.

In the event of a tensile loading of the force transmission element 10, the loop assembly 26 is stretched and the distance A between the strands 42, 44 of the loop assembly 26 decreases. As a result, the pressure elements 28, 30 approach each other until they come to bear against each other by their bearing surfaces 32, 34. When the bearing surfaces 32, 34 of the pressure elements 28, 30 bear against each other, a sudden increase of the rigidity occurs and the elastomer body 12 can only be deformed further in the region of the openings 36, 38 by the compressive force, generated by the strands 42, 44 approaching each other due to tensile load, being absorbed by the pressure elements 28, 30 under deformation. The rigidity of the force transmission element 10 therefore progressively increases. Put another way, the force transmission element 10 in the event of low tensile loading is relatively "soft", i.e. it has low rigidity, until the bearing of the two pressure elements 28, 30 against each other occurs. Subsequently, the rigidity sharply increases and a further tensile loading causes a deformation of the elastomer in the region of the openings 36, 38 as well as of the pressure elements 28, 30. The rigidity of the force transmission element 10 increases under tensile load until the strands 42, 44 of the loop assembly 26 owing to the tensile loading run virtually parallel and the compressive force generated by them in the transverse direction tends to zero.

Figure 4:
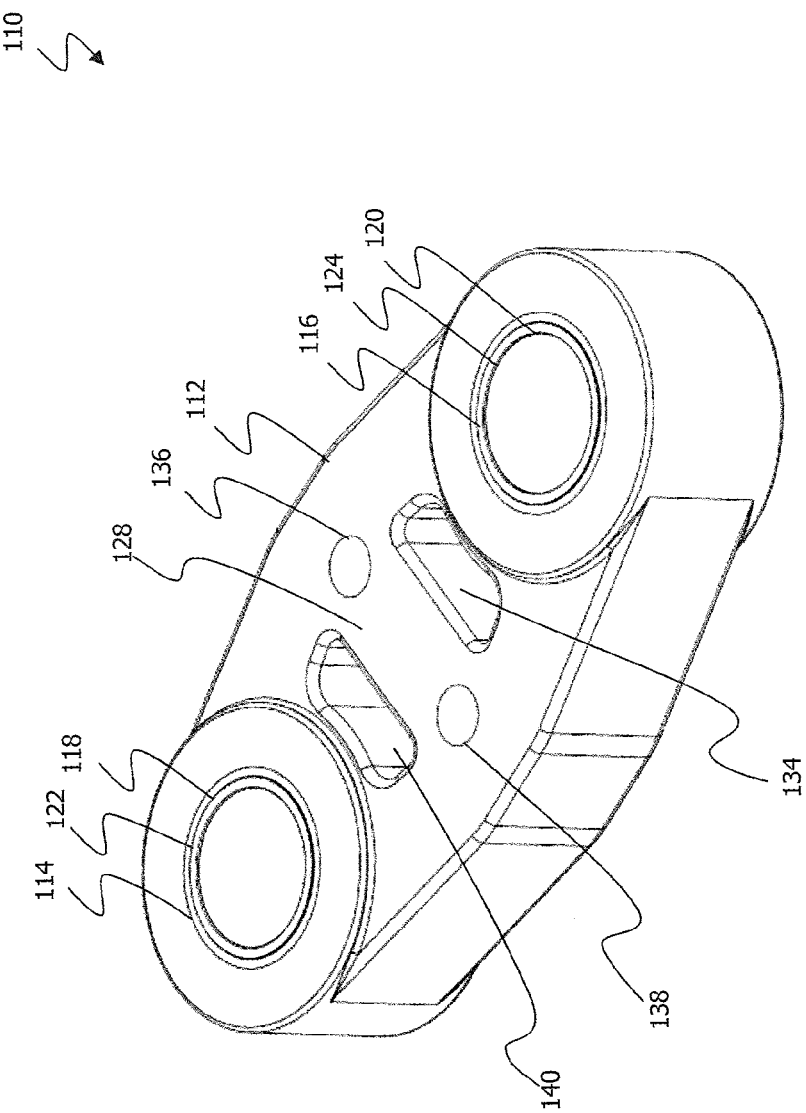
FIG. 4 shows a perspective view of a second embodiment of the present invention.

FIG. 4 shows a perspective view of a force transmission element 110 according to a second embodiment of the invention.

Compared with the embodiment described with reference to FIGS. 1 and 3, the embodiment according to FIG. 4 has only one pressure element 128, which extends uninterruptedly, i.e. continuously in the region between the strands 142, 144 of the loop assembly 126. The pressure element 128 extends transversely to the direction of the longitudinal axis L through the cutout 140.

Figure 5:
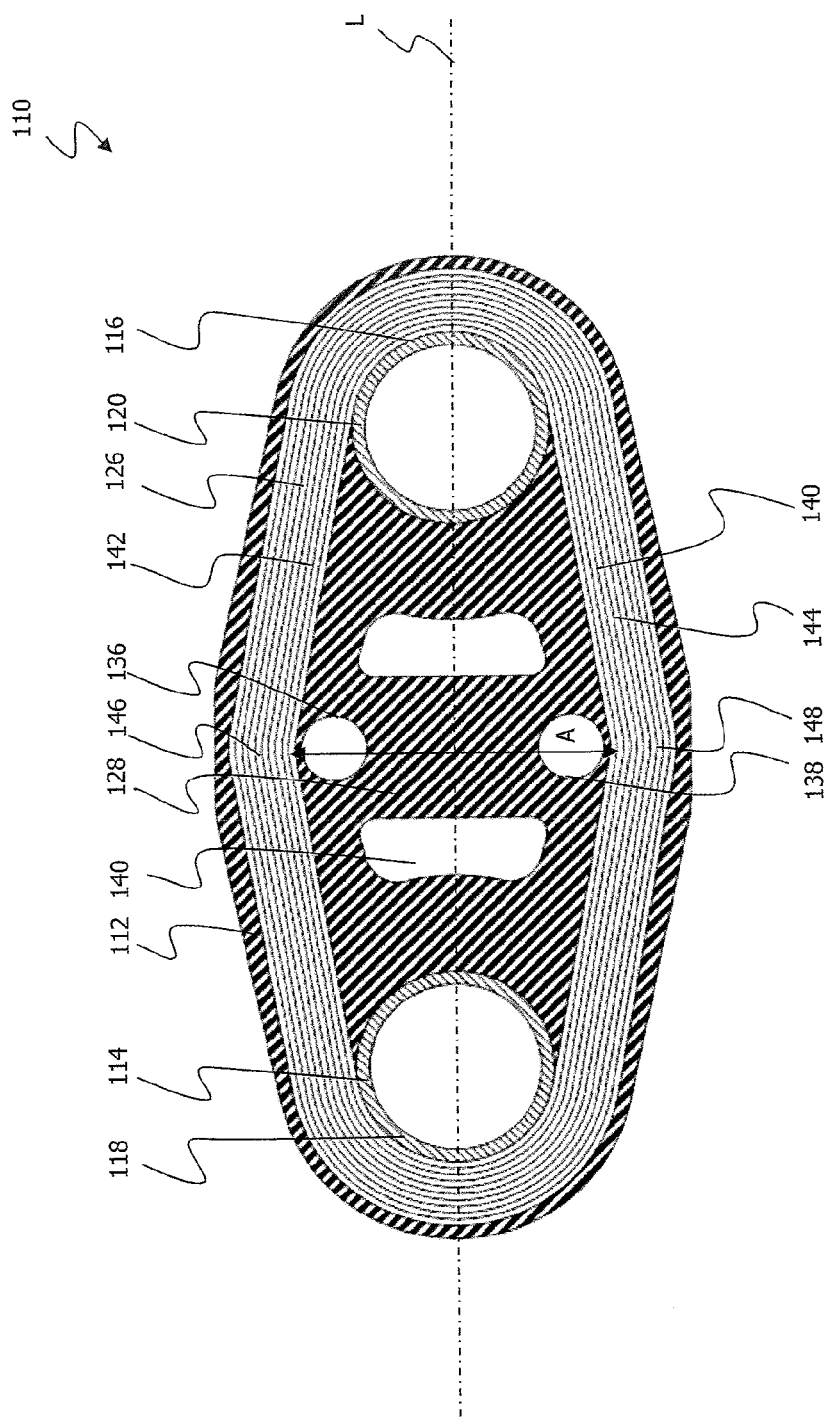
FIG. 5 shows a sectional view of the force transmission element according to a second embodiment of the invention.

FIG. 5 shows a sectional view of a force transmission element 110 according to the second embodiment of the invention.

As in the embodiments described above, the pressure element 128 is arranged in the region of the maximum distance A between the strands 142, 144 of the loop assembly 126, i.e. in the region of the kinks 146, 148 of the strands 142, 144.

If the elastic force transmission element 110 is loaded with a tensile force, the strands 142, 144 approach each other and with the transverse force resulting from the approach deform the elastomer body 112 in the region of the openings 136, 138 until the compressive force is absorbed by the pressure element 128. Since the pressure element 128 can absorb the compressive force, generated by the strands 142, 144, under a deformation in accordance with its compressive loading, the rigidity of the force transmission element 100 progressively increases. The rigidity of the force transmission element 100 again increases until the strands 142, 144 of the loop assembly 126 owing to the tensile loading run virtually parallel and the compressive force generated by them tends to zero.

FIGS. 6 to 8b show views of a force transmission element 210 according to a third embodiment of the invention.

The structure and functioning of the force transmission element 210 correspond largely to the structure of the first embodiment described with reference to FIGS. 1 and 3.

The third embodiment differs from the first embodiment by the bushings 250 and 252 arranged in the openings 236, 238.

The structure of the bushings 250 and 252 can be seen in FIGS. 8a and 8b. The bushings 250 and 252 have a tubular portion 250a and in each case two plate-shaped regions 250b, 252b. With their portions 250a and 250b, 252b the bushings 250 and 252 partially surround the strands 242 and 244 of the loop assembly 226. The tubular portion 250a of the bushings 250 and 252 is arranged between the strands 242 and 244. The plate-shaped portions 250b, 252b bear against the loop assembly 226.

Figure 9:
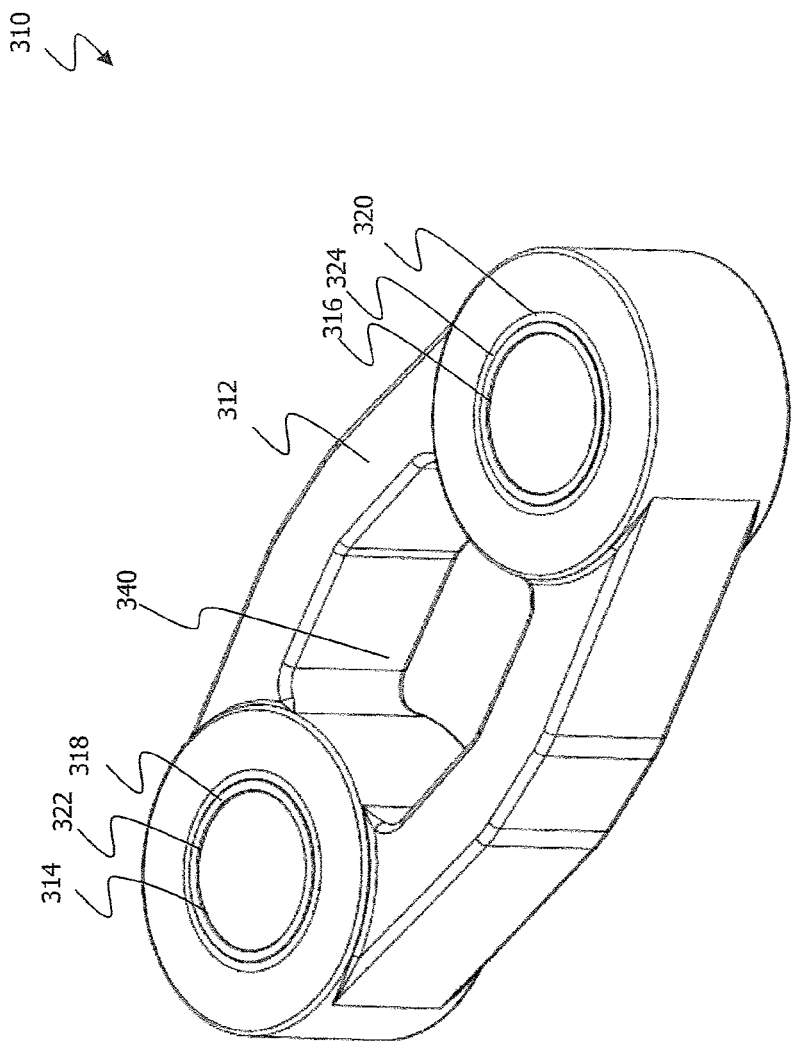
FIG. 9 shows a perspective view of a force transmission element according to a fourth embodiment of the invention.

FIG. 9 shows a perspective view of a force transmission element 310 according to a fourth embodiment.

It can already be seen from FIG. 9 that no pressure elements are provided in the fourth embodiment, but rather merely two arms of the elastomer body 312 extend between the bushings 318 and 320. The cutout 340 is accordingly of enlarged design compared with the embodiments described above.

Figure 10:
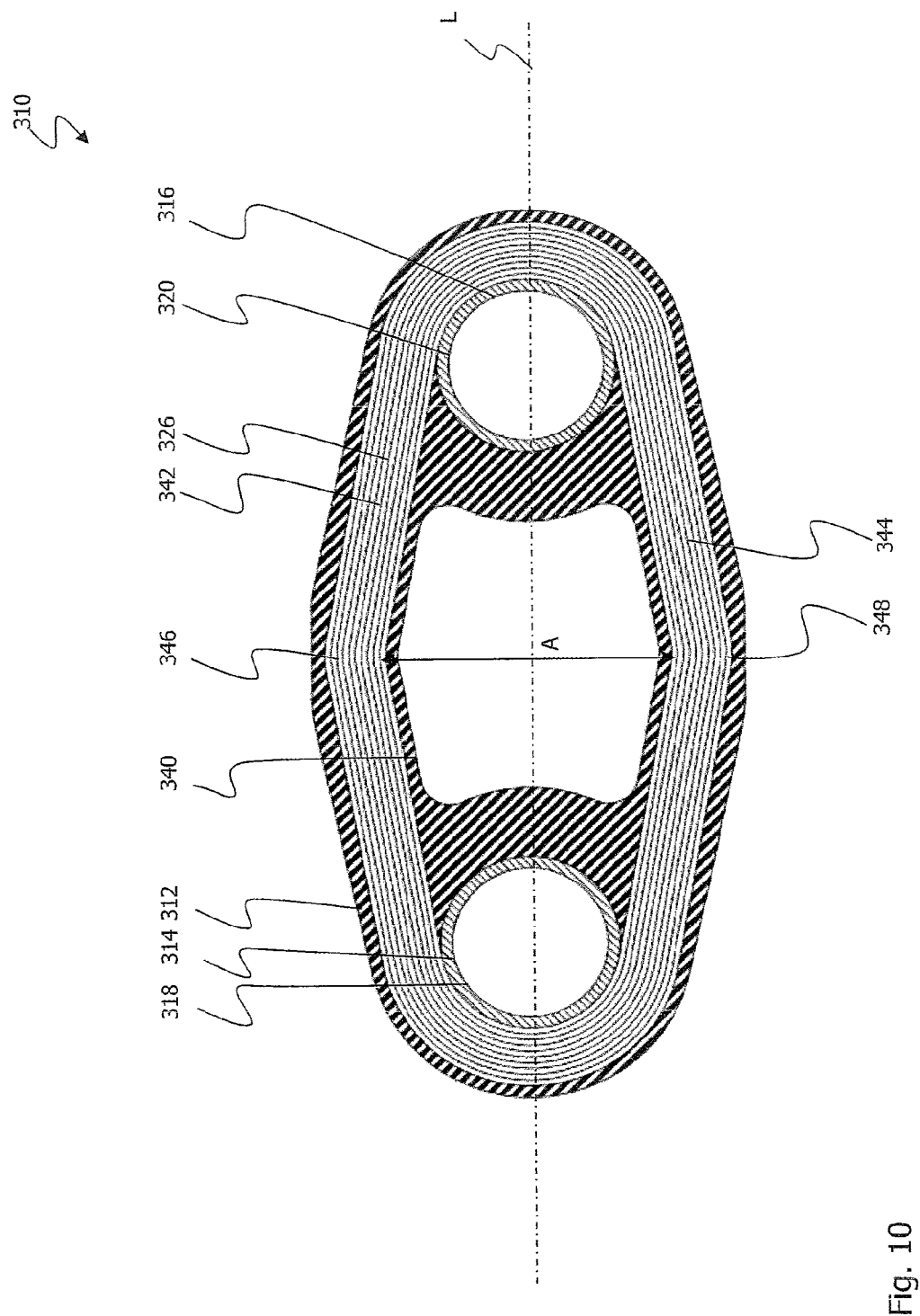
FIG. 10 shows a sectional view of the force transmission element according to the fourth embodiment of the invention.

FIG. 10 shows a sectional view of the force transmission element 310 according to the fourth embodiment.

Compared with the embodiments described above, it can be seen from FIG. 10 that the opposite strands 342, 344 of the loop assembly 326 define the cutout 340 between them in the region between the bushings 318, 320, i.e. in the embodiment according to FIG. 10 no further components are provided between the strands 342, 344. The rigidity of the elastic force transmission element 310 is accordingly determined only by the loop assembly 326 embedded in the elastomer or rubber material and its shape with the predetermined deformation, i.e. with the kinks 346, 348 of the strands 342, 344.

In the event of a tensile loading, only the strands 342, 344 of the loop assembly 326 are elastically deformed with the rubber mass surrounding them until they run substantially parallel, i.e. are at a constant distance from each other. In other words, in the event of a tensile loading of the force transmission element 310, there results, from the strands 342, 344 provided with a kink 346, 348, a transverse force and the distance between the strands 342, 344 decreases until they run almost parallel and the transverse force tends to zero.

The smaller the distance A between the strands 342, 344 at the kinks 346 and 348, the smaller the resulting transverse force also becomes. Accordingly, the rigidity of the force transmission element 310 according to the fourth embodiment of the invention progressively increases with the decreasing distance A. Put another way, with the force transmission element 310, a characteristic curve for the rigidity with a soft zero crossing and a sharp progression is achieved.

Figure 11:
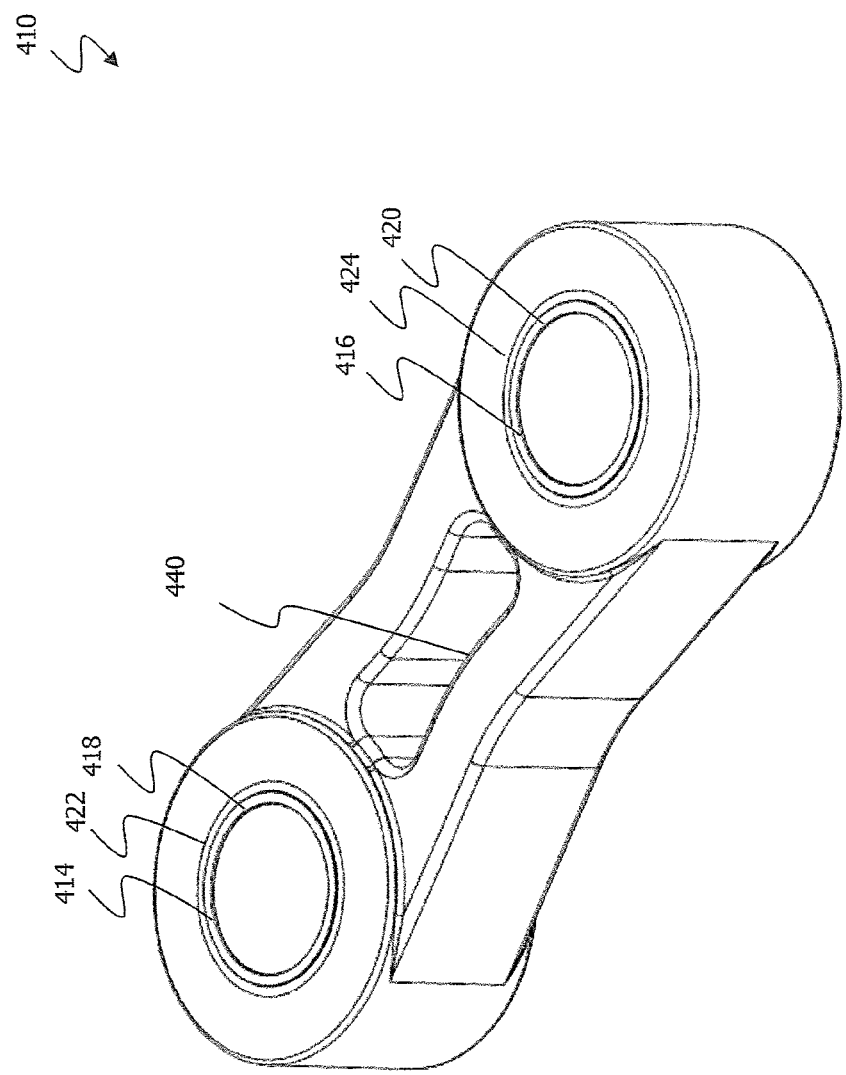
FIG. 11 shows a perspective view of a force transmission element according to a fifth embodiment of the invention.
Figures 12A, 12B:
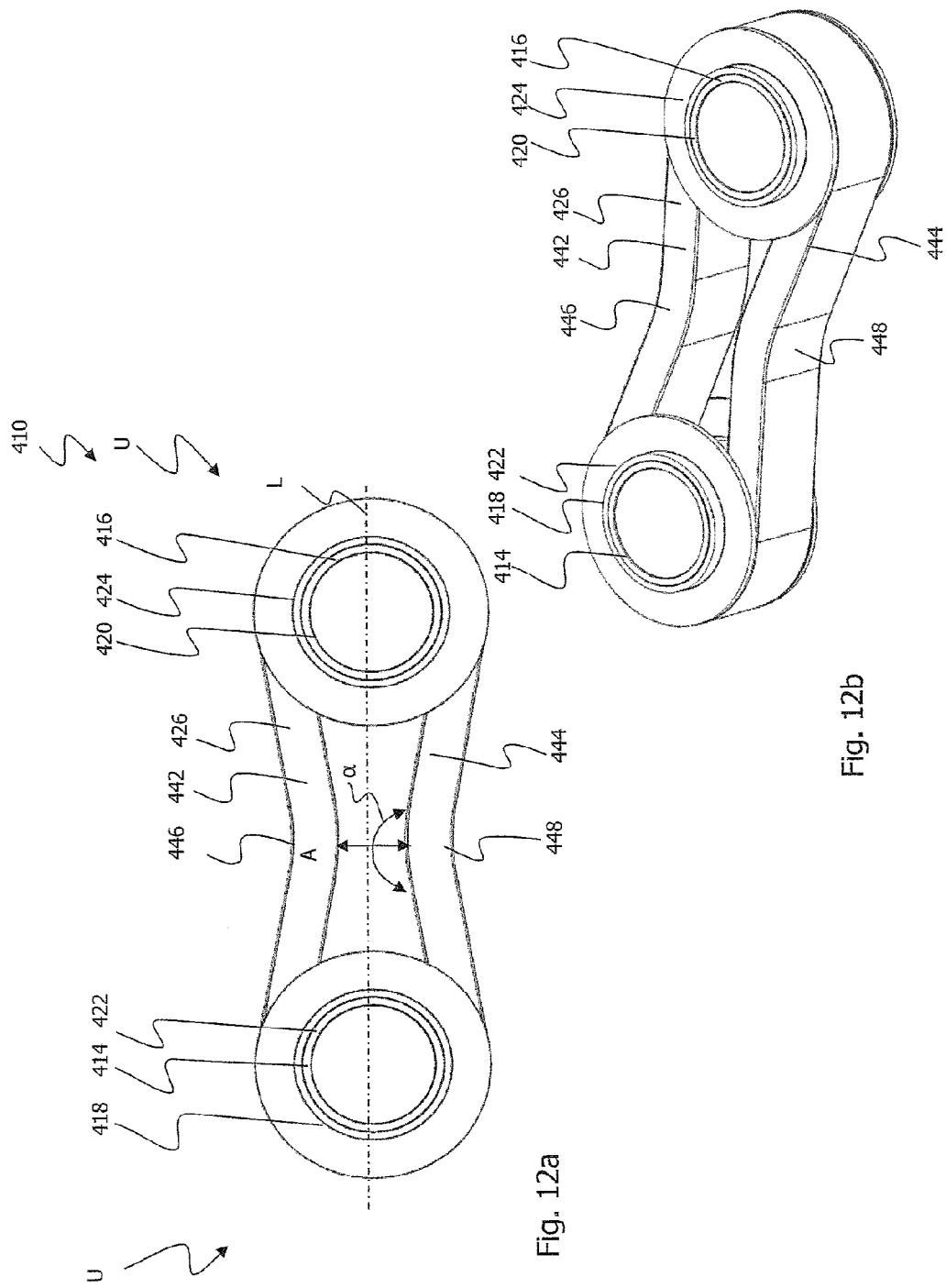
FIGS. 12a and 12b show a plan view and a perspective view of the bushings, and of the loop assembly looping around the bushings, of the force transmission element according to the fifth embodiment of the invention.
Figure 13:
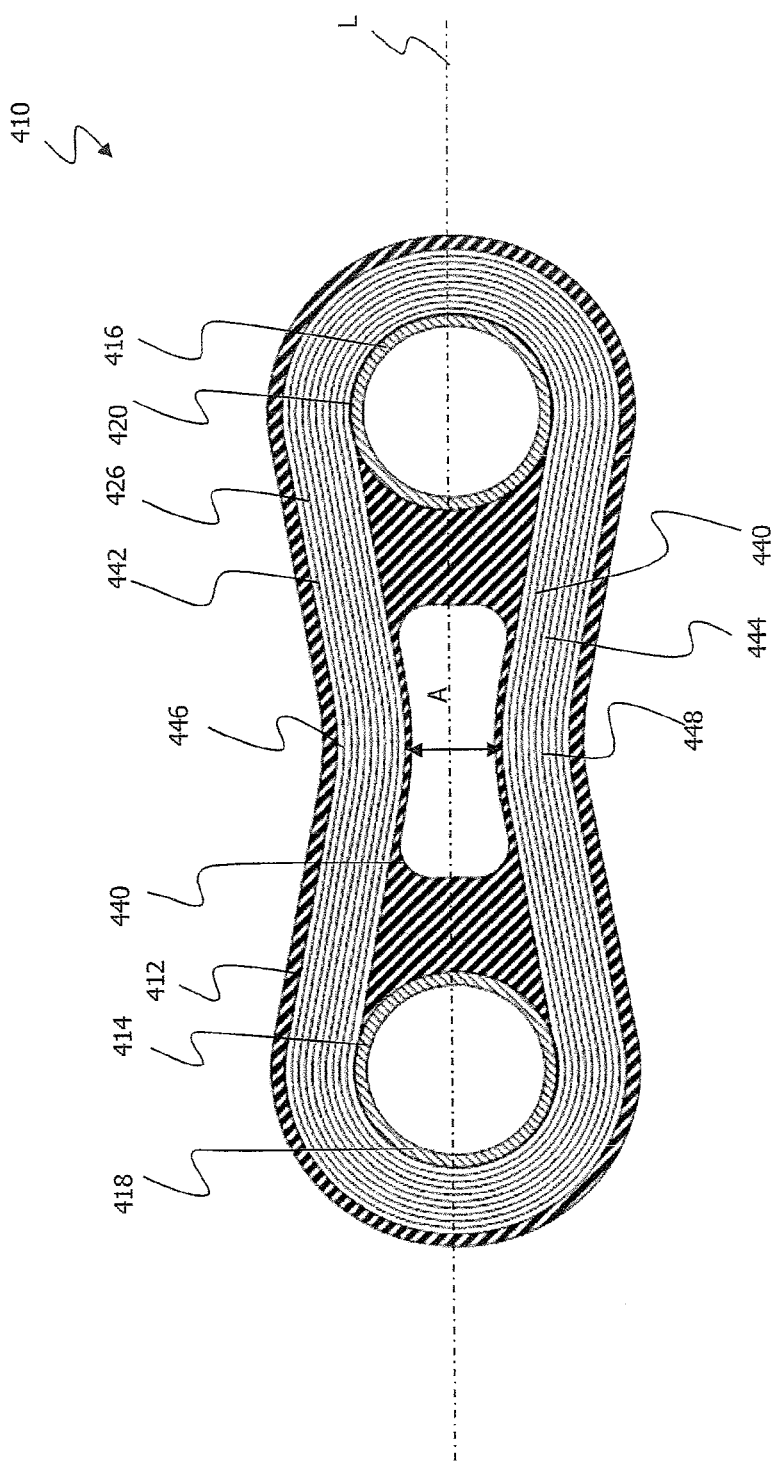
FIG. 13 shows a sectional view of the force transmission element according to the fifth embodiment of the invention.

FIGS. 11 to 13 show different views of a force transmission element 410 according to a fifth embodiment.

The only difference from the fourth embodiment consists in the predetermined deformation of the strands 442, 444. The distance between the stands 442 and 444 decreases owing to the predetermined deformation starting from the bushings 418 and 420 up to a region with the minimum distance A, in which the kinks 446 and 448 are formed, i.e. the minimum distance A is between the kinks 446 and 448.

In the event of a tensile loading, the strands 442, 444 of the loop assembly 426 are elastically deformed until they are at a constant distance from each other. Put another way, the strands 442, 444 are moved outwards away from the longitudinal axis L until they run parallel to each other.

The functioning of the force transmission element 410 is otherwise similar to the mode of operation of the fourth embodiment.

Figure 14:
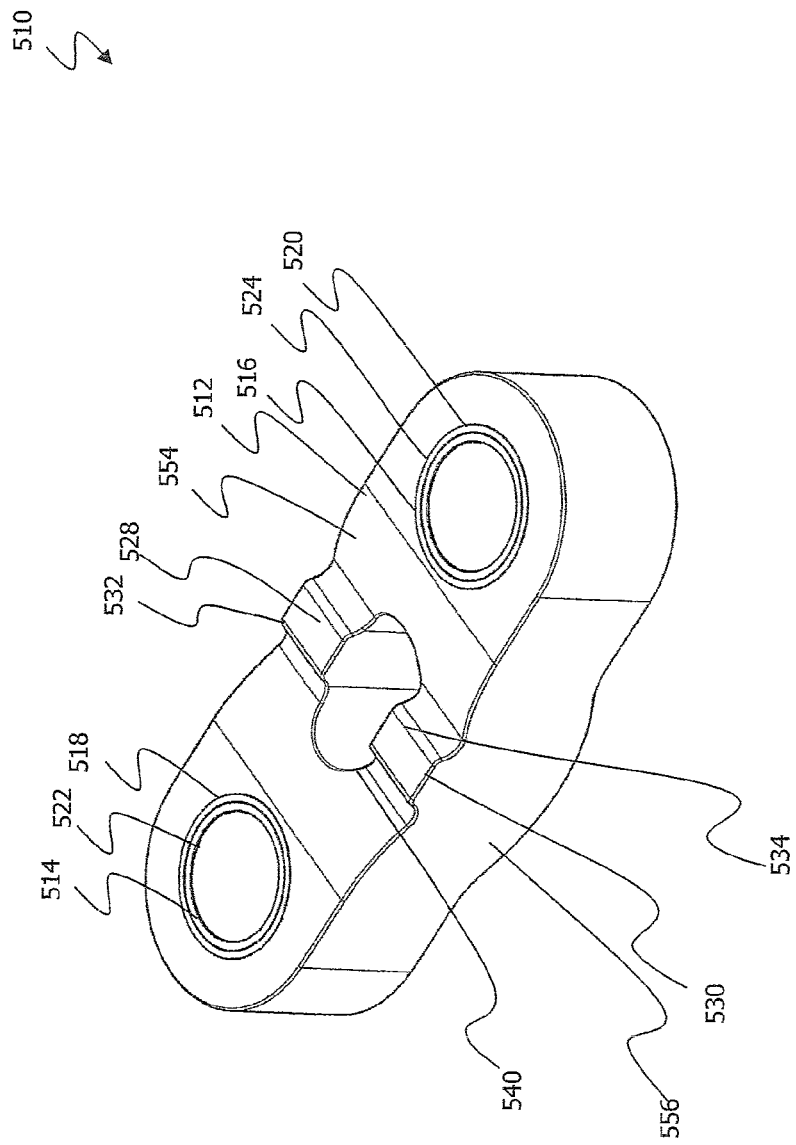
FIG. 14 shows a perspective view of a force transmission element according to a sixth embodiment of the invention.

FIG. 14 shows a perspective view of a force transmission element 510 according to a sixth embodiment of the invention.

Bushings 518 and 520 are arranged in the receiving openings 514 and 516. In the elastomer body 512 there is formed a cutout 540 which extends centrally in the elastomer body 512 between the receiving openings 514 and 516.

In FIG. 14 there can already be seen in outline a predetermined deformation of the elastomer body 512 in the form of an arching 554.

FIGS. 15a to 15c show different views of the bushings 518 and 520 and of the loop assembly 526 looping around the bushings 518, 520 according to the sixth embodiment.

The opposite strands 542 and 544 of the loop assembly 526 are provided, in the region between the bushings 518 and 520, in each case with a predetermined deformation in the form of an arching 554 and 556. The deformation 554 and 556 extend in the axial direction of the bushings 518 and 520.

FIGS. 16a and 16b show a plan view and a side view of the force transmission element 510.

In particular in FIG. 16b there can be seen here the arching 554 of the loop assembly shown in FIG. 15b, which is shown in FIGS. 16a and 16b in the state embedded in the elastomer body 512.

Shown in the region of the deformations 554, 556 of the strands 542, 544 are pressure elements 528, 530 which extend transversely to the longitudinal axis of the force transmission element 510. In the event of a tensile loading, the force transmission element 510 can be supported on further components via the pressure elements 528, 530 for absorption of the compressive or transverse force.

FIG. 16c shows a sectional view of the force transmission element 510. In the sectional view according to FIG. 16c there can be seen the bushings 518 and 520 which each have collar bushings 522 and 524 at their axial ends. The collar bushings 522, 524 support the loop assembly 526 in the axial direction of the bushings 518, 512. In the region between the bushings 518 and 520 there can be seen the deformation 554 as well as the pressure element 528 which is situated in the inwardly arched region 558 of the arching 554.

In the event of a tensile loading of the force transmission element 510, the loop assembly 526 is stretched, whereby the archings 554 and 556 of the strands 542 and 544 of the loop assembly 526 decrease. In other words, in the event of a tensile loading, only the strands 542, 544 of the loop assembly 526 together with the rubber mass surrounding them are elastically deformed until the strands 542 and 544 change into a substantially stretched state. The more the strands 542, 544 approach their stretched state, the less the resulting transverse force becomes. When the strands 542 and 544 reach their almost fully stretched state, the transverse forces tend to zero. The rigidity of the force transmission element 510 thus progressively increases with the decreasing archings 554 and 556 until finally a stretched state of the strands 542, 544 is reached, in which the rigidity is at the maximum.

Figure 17:
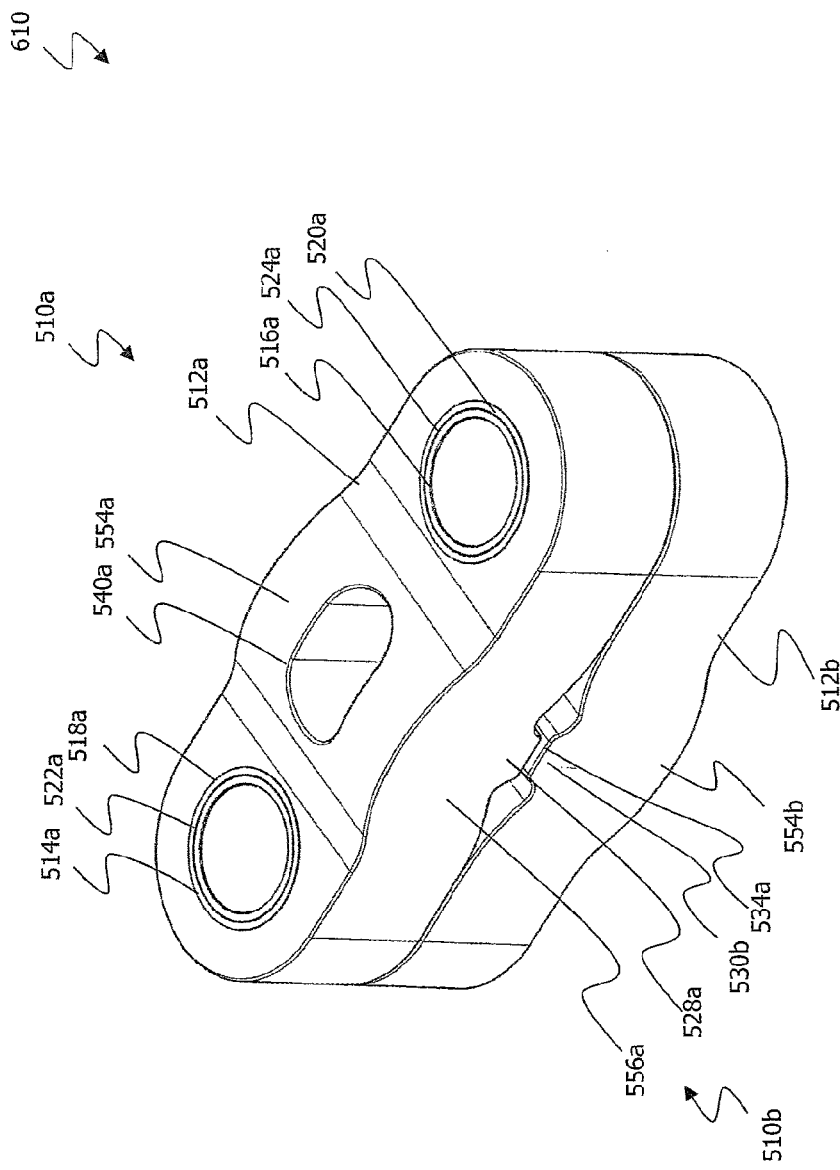
FIG. 17 shows a perspective view of a force transmission device according to a seventh embodiment of the invention.
Figure 18:
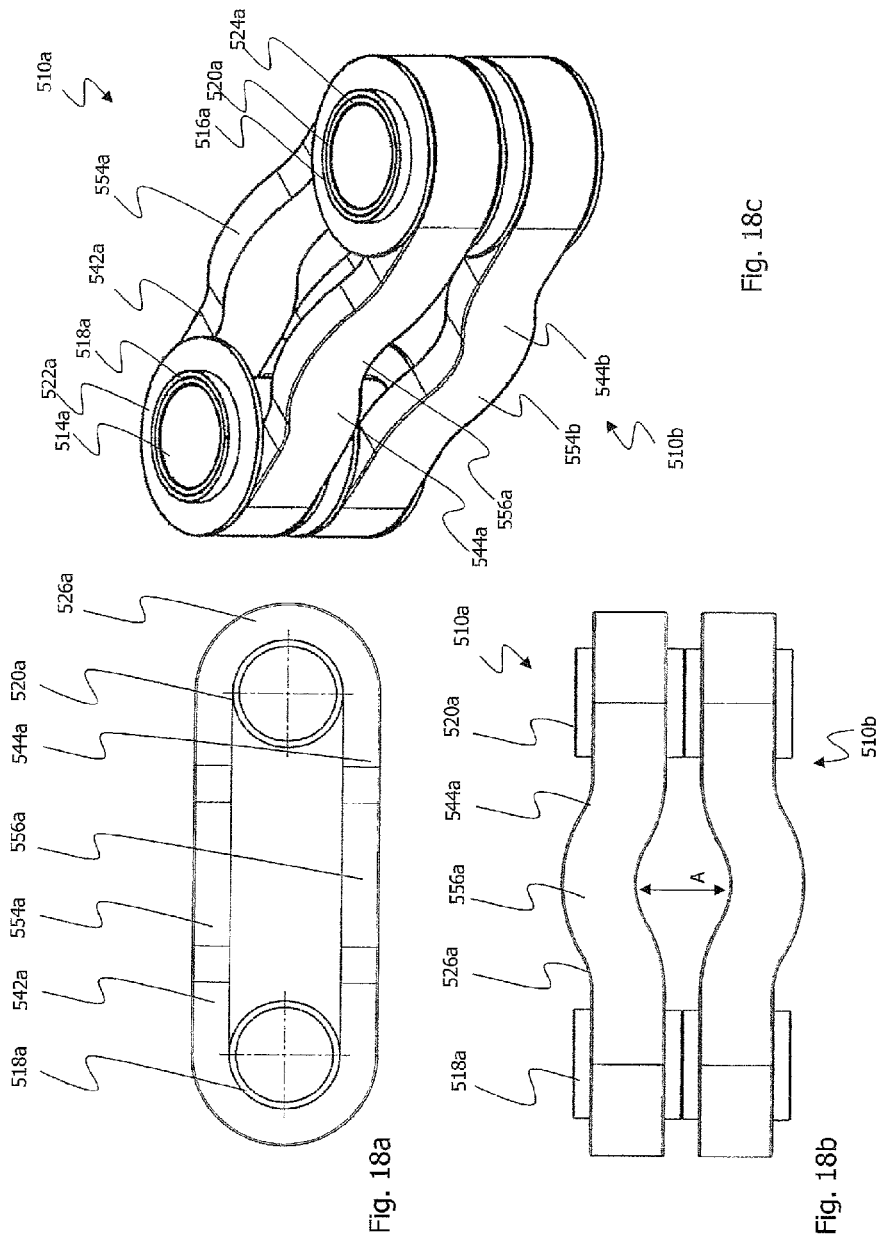
FIGS. 18a to 18c show views of the bushings, and of the loop assemblies looping around the bushings, of the force transmission device according to the seventh embodiment of the invention.
Figure 19:
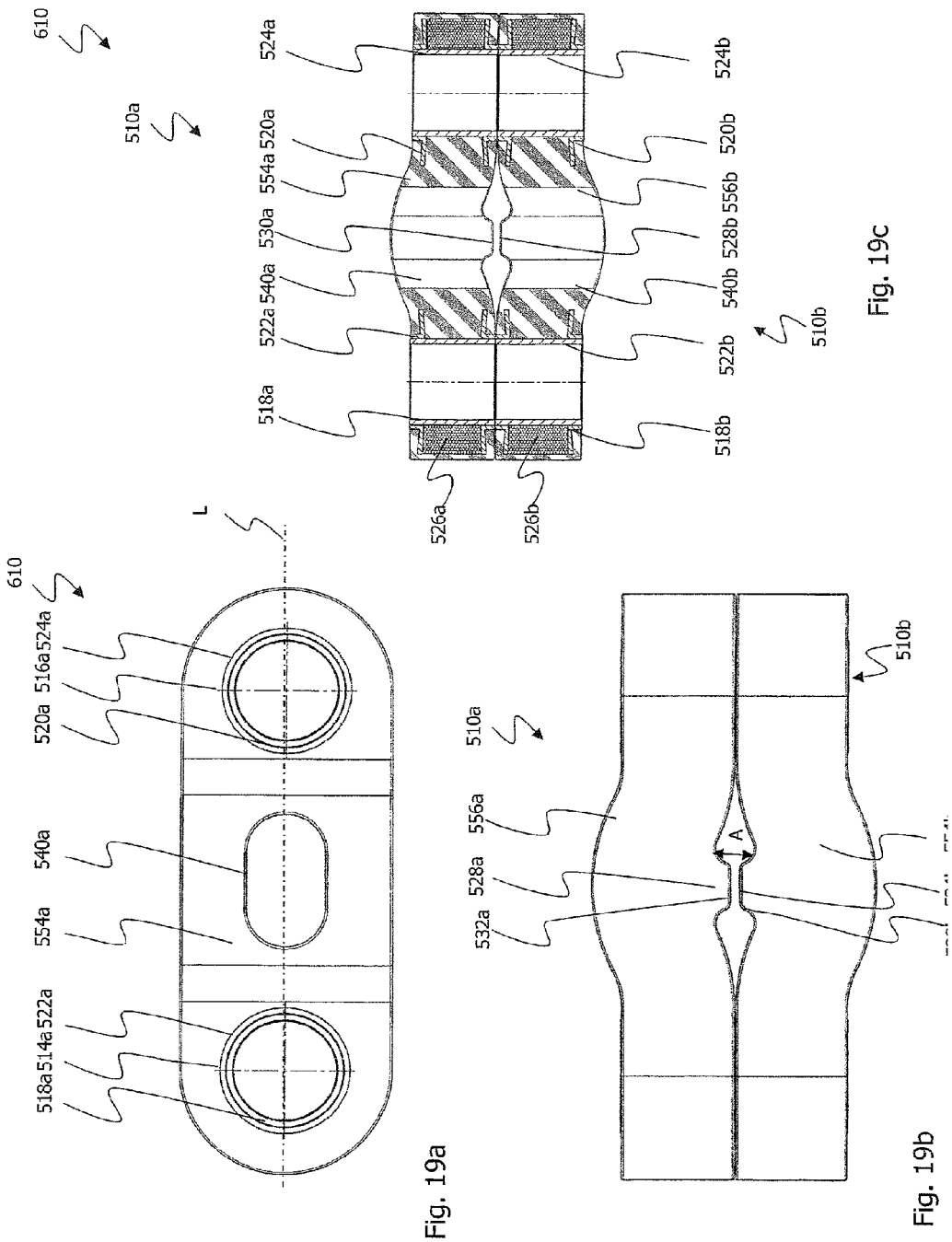
FIGS. 19a to 19c show views of the force transmission device according to the seventh embodiment of the invention.

FIG. 17 shows a perspective view of a force transmission device 610 according to a seventh embodiment of the invention.

The force transmission device 610 has two force transmission elements 510a and 510b according to the embodiment of the invention described with reference to FIGS. 14 to 16c.

The force transmission device 610 accordingly comprises two force transmission elements 510a and 510b which are arranged in such a manner that their respective archings 554a, 556a and 554b rise in the axial direction of the bushings 518a, 520a and 518b, 520b in opposite directions. The structure of the force transmission elements 510a and 510b corresponds to the structure of the force transmission elements 510 described with reference to FIGS. 14 to 16c.

The two force transmission elements 510a and 510b are each arranged with their archings 554a, 556a and 554b in such a manner that the corresponding pressure elements 530a, 528a, 528b, 530b lie opposite each other in the region of the maximum distance A between the loop assemblies 526a, 526b of the force transmission elements 510a and 510b. This is achieved in that the archings 554a, 556a, 554b and 556b are oppositely arched in axial directions. The pressure elements 528a, 530a, 528b, 530b are arranged here on the inwardly arched portion of the elastomer body 512a, 512b, or of the loop assemblies 526a and 526b.

In the event of a tensile loading of the force transmission device 610, the loop assemblies 526a and 526b are stretched and the distance A between the strands 542a, 544a, 542b, 544b of the loop assemblies 526a, 526b decreases. As a result, the pressure elements 528a, 530a, 528b, 530b approach each other until their corresponding bearing surfaces 532a, 534b come to bear against each other. When the bearing surfaces 532, 534 of the corresponding pressure elements 528a, 530a, 528b, 530b bear against each other, a progressive increase of the rigidity occurs and the elastomer bodies 512a and 512b are deformed further in that the compressive force, generated by the strands 542a, 542b and 544a, 544b approaching each other in pairs due to tensile load, is absorbed by the pressure elements 528, 530 under elastic deformation. In other words, the force transmission device 610 in the event of low tensile loading is relatively "soft" until the pressure elements 528a, 530a, 528b, 530b bear against each other. The rigidity of the force transmission arrangement 610 increases accordingly under tensile load until the corresponding strands 542a, 544b and 542a, 542b of the loop assemblies 526a and 526b owing to the tensile loading run virtually parallel and the transverse force generated by them in the transverse direction tends to zero.

Figure 20:
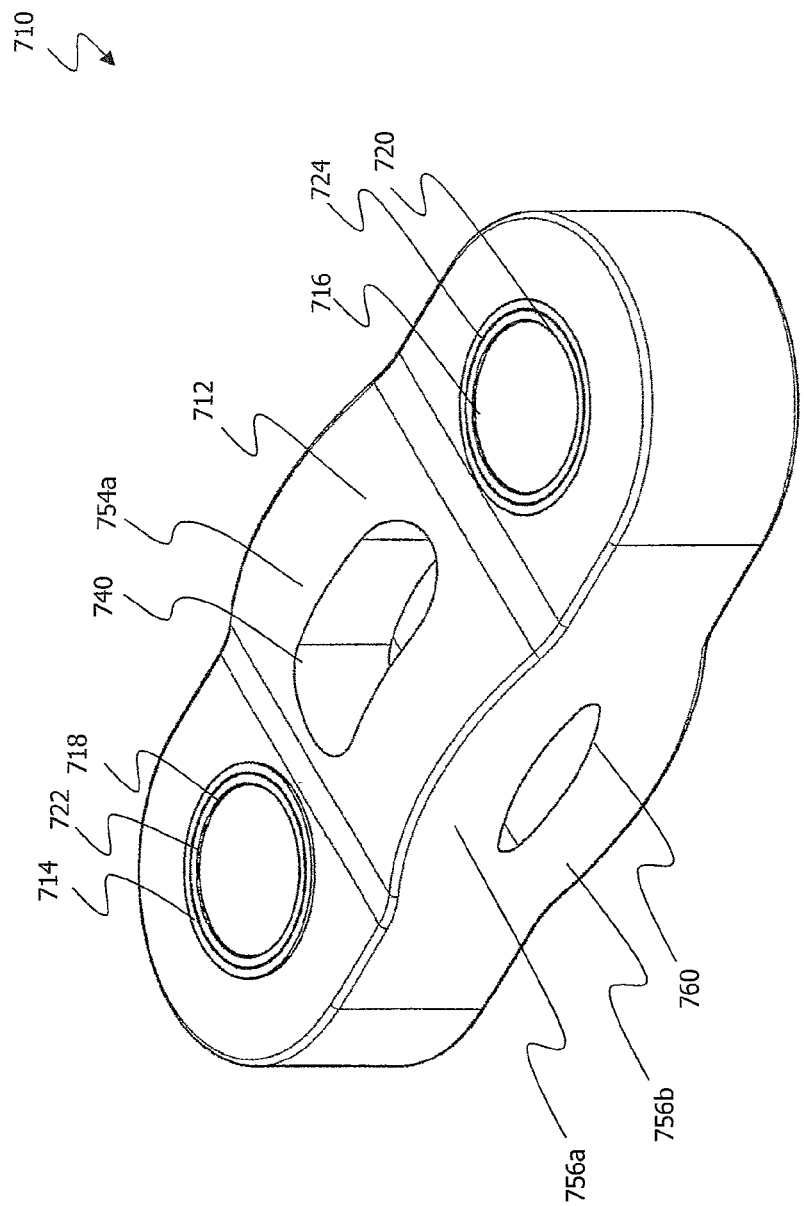
FIG. 20 shows a perspective view of a force transmission element according to an eighth embodiment of the invention.

FIG. 20 shows a perspective view of a force transmission element 710 according to an eighth embodiment of the invention.

In FIG. 20 it can already be seen that there is provided in the elastomer body 712 a further cutout 760 which extends through the elastomer body 712 transversely to the axial direction of the bushings 718, 720. The cutout 760 is formed between the deformations 754a, 756a and 756b, FIGS. 21a to 21c show different views of the loop assembly 726 which loops around the bushings 718, 720 in the looping region U and is supported by the collar bushings 722 and 724 in the axial direction.

In particular, FIGS. 21b and 21c show the sub-strands 742a and 744a, 744b of the loop assembly 726 in the region between the bushings 718 and 720, i.e. the strands 742, 744 of the loop assembly 726 are divided in the region between the bushings 718, 720 into individual sub-strands 742a and 744a, 744b. The sub-strands 742a, 744a and 744b each have an arching 754a and 754b, and 756a and 756b. The sub-strands 742a, 744a and 744b are each arched in opposite directions in the axial direction of the bushings 718, 720. In other words, the sub-strands 742a, 742b, 744a, 744b define a distance A between each other.

In the region between the bushings 718 and 720, the sub-strands 742a, 742b, 744a 744b are individually embedded in the elastomer body 712, whereby the cutout 760 is defined in the elastomer body 712.

Figures 22A, 22B:
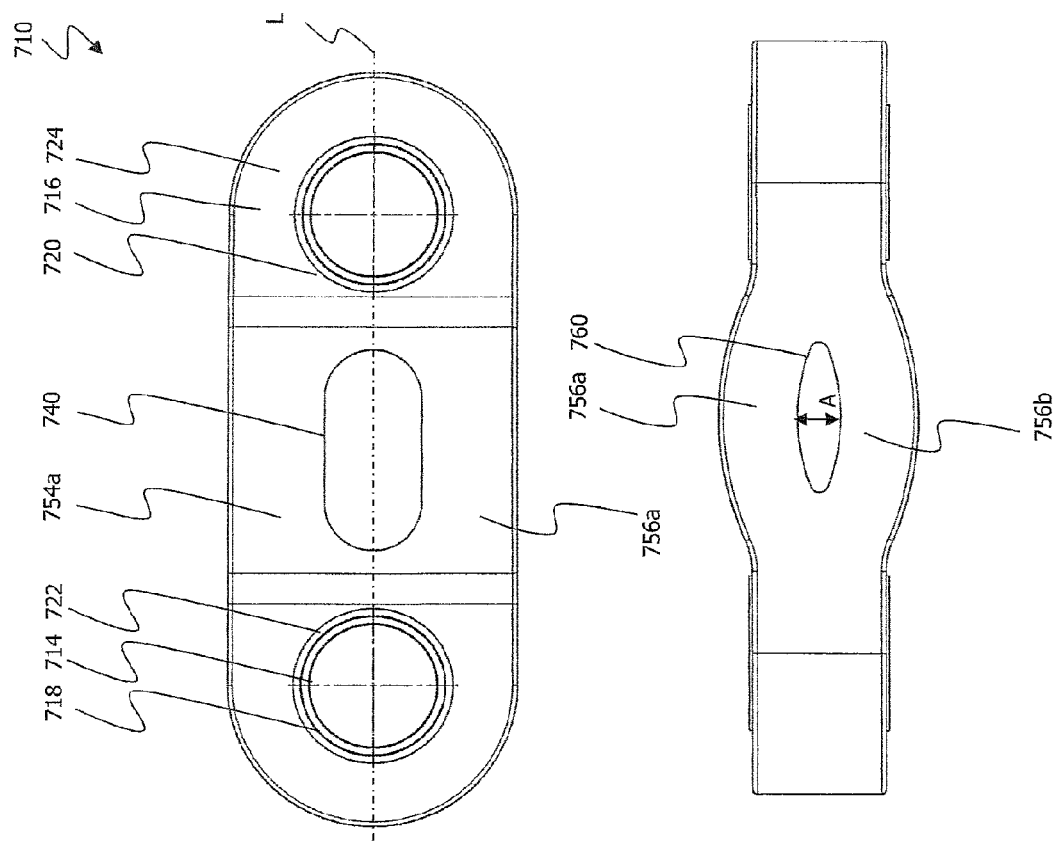
FIGS. 22a and 22b show views of the force transmission element according to the eighth embodiment of the invention.

FIGS. 22a and 22b show a plan view and a front view of the force transmission element 710.

In the event of a tensile loading of the force transmission element 710, the sub-strands 742a, 744a, 744b of the strands 742, 744 of the loop assembly 726, which are deformed in a predetermined manner, are elastically deformed until they change into an almost stretched state. As a result, the elastomer body 712 is deformed in the region of the cutout 760 until the cutout 760 is almost eliminated.

In other words, the rigidity of the force transmission device 710 is initially determined only via the strands 742, 744 of the loop assembly 726, i.e. until the sub-strands 742a, 744a, 744b assume a stretched or parallel state. Owing to the stretching of the strands 742, 744, the elastomer body 712 is deformed in such a manner that the cutout 760 is almost eliminated and the sub-strands 742a, 744a, 744b surrounded by the elastomer mass bear against each other. As a result, the rigidity of the force transmission element is progressively increased.

FIG. 23a shows a front view of an elastic force transmission element 810 according to a ninth embodiment of the invention. The force transmission element 810 corresponds as regards the structure largely to the embodiments of the invention described with reference to FIGS. 1 to 8.

In the region of the force transmission element 810 between the bushings 818 and 820 there can be seen the cutout 840 in the rubber-elastic body 812. In this region there are arranged between the bushings 818 and 820 the pressure elements 828 and 830 which are spaced apart from each other and which each have a bearing surface 832 and 834. According to this embodiment, the bearing surfaces 832, 834 form the lateral surfaces of the cutout 840 which run parallel to the longitudinal axis L. The cutout 840 extends semicircularly between the two bearing surfaces 832 and 840.

In the elastomer body 812 there are formed openings 836, 838 which form, together with the pressure elements 828 and 830, the pressure absorption device by means of which the rigidity of the force transmission element can be progressively increased in the event of a compressive loading. The openings 836, 838 extend through the elastomer body 812 and are formed adjacent to the pressure elements 828, 830.

FIG. 23b shows a sectional view along the section line A-A from FIG. 23a. In FIG. 23b there can be seen inserts 854, 856 which are provided in the region of the openings 836 and 838 on the strands 842 and 844 of the loop assembly 826 and give the openings 836 and 838 the crown shape shown in FIG. 23a.

In the event of a tensile loading of the force transmission element 810, the loop assembly 826 is stretched and the distance A between the strands 842 and 844 of the loop assembly 826 decreases. As a result, the pressure elements 828, 830 approach each other until they come to bear against each other by their bearing surfaces 832, 834. When the bearing surfaces 832, 834 of the pressure elements 828, 830 bear against each other, the elastomer body 812 can only be deformed further in the region of the openings 836, 838 by the compressive force, generated by the strands 842, 844 approaching each other due to tensile load, being absorbed by deformation of the pressure elements 828, 830 as well as of the openings 836, 838.

The inserts 854 and 856 are discussed in more detail with reference to FIGS. 24a and 24b.

FIG. 23c shows a sectional view along the section line B-B from FIG. 23a.

In FIG. 23c there can be seen the collar bushings 822 and 824 which are provided at the axial ends of the bushings 818, 820 and are provided for axial supporting of the loop assembly 826.

Figures 24A, 24B:
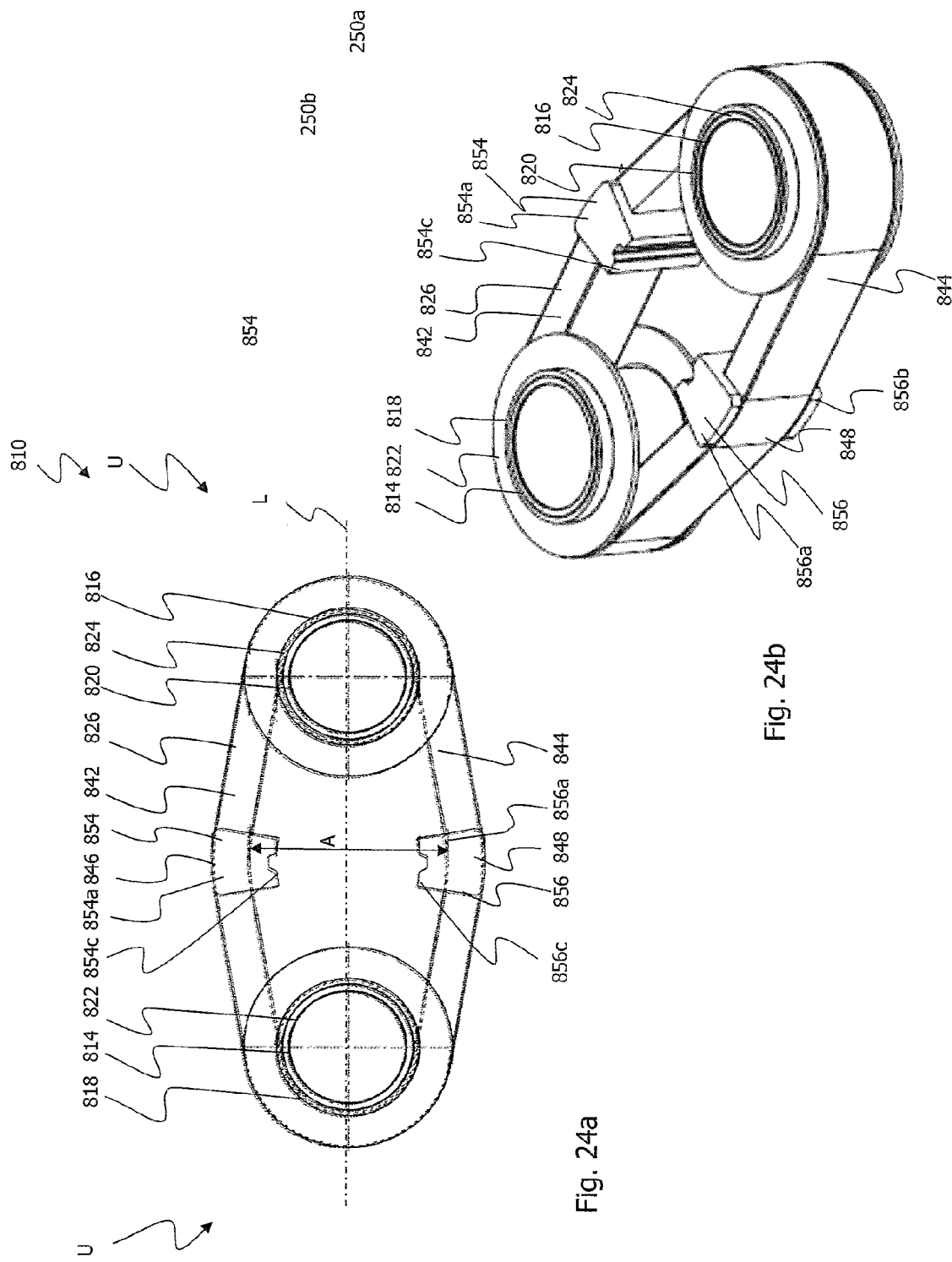
FIGS. 24a to 24b show views of the bushings, and of the loop assembly looping around the bushings, of the force transmission element according to the ninth embodiment of the invention.

FIGS. 24a and 24b show a front view and perspective view of the bushings 818, 820 as well as of the loop assembly 826 looping around the bushings with the inserts 854 and 856 arranged thereon.

The inserts 854 and 856 as well as the bushings 818, 820, the collar bushings 822, 824 and the loop assembly 826 are covered with the elastomer covering 812 (FIG. 23a).

The inserts 854 and 856 have two plate-shaped portions 854a, 856a, 856b, between which a strip-shaped portion 854c, 856c extends. With their portions 854a, 854c as well as 856a, 856b, 856c, the inserts 854 and 856 of the strands 842 and 844 of the loop assembly 826 partially surround or bear against individual surfaces of the loop assembly 826. The strip-shaped portions 854c and 856c lie opposite each other and form with their contoured surface a wall portion of the openings 836 and 838 (FIG. 23a). The inserts 854 and 856 are provided in the region of the maximum distance A between the strands 842 and 844 on the loop assembly 826 and promote the transmission of the transverse force generated by the loop assembly 826 to the elastomer body 812 or to the pressure absorption device.

Figure 25:
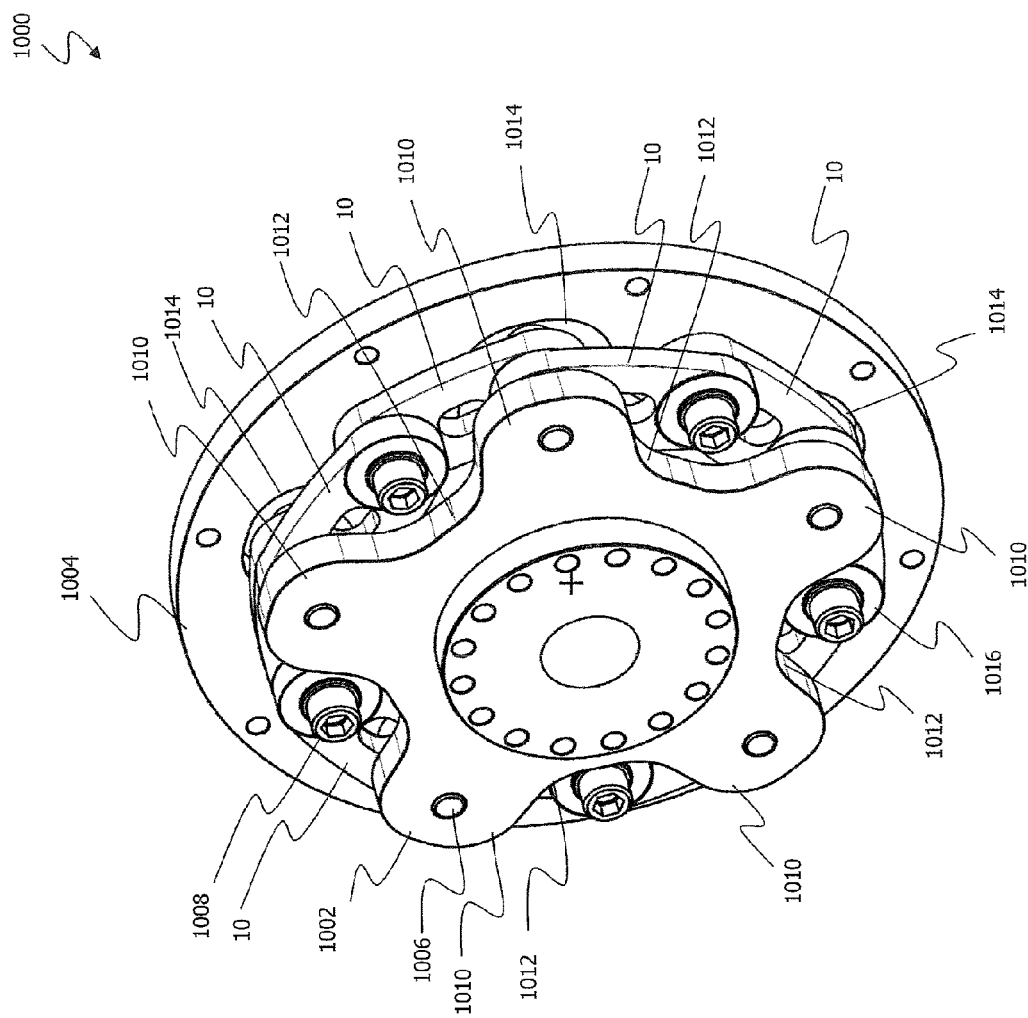
FIG. 25 shows a perspective view of a coupling device according to the invention.

FIG. 25 shows a coupling 1000 for torque transmission between two shaft portions (not shown).

The coupling 1000 has a first flange 1002 and a second flange 1004. The first flange 1002 has a plurality of fastening elements 1006 and the second flange 1004 has a plurality of fastening elements 1008. A fastening element 1006 of the first flange 1002 and a fastening element 1008 of the second flange 1004 are connected to each other via a force transmission element 10 according to one of the embodiments described above. The fastening elements 1006, 1008 here can be bolts or screws which can be screwed into the flanges 1002 and 1004.

The first flange 1002 is of star-shaped form, whereas the second flange 1004 is of disc-shaped form. The start-shaped first flange 1002 has five arms 1010, into each of which a screw 1006 is screwed.

Between the individual arms 1010 or in cutouts or recesses 1012 of the first flange 1002 there can be seen the screws 1008 which are screwed to the second flange 1004 and project into the recesses 1012 of the first flange. In the second flange 1004 there are provided cutouts 1014, into which the fastening elements 1006 screwed to the first flange 1002 project. The fastening elements 1006 and 1008 of the first flange 1002 and of the second flange 1004 are connected to each other in pairs via a force transmission member 10. The force transmission members 10 are supported here by washers 1016 on the screws 1008.

With the coupling 1000, axial or/and angular offsets between the shaft portions to be connected can be compensated.

The invention claimed is:

1. Elastic force transmission element, in particular for transmitting torques, having:
   at least two bushings for connection to at least two force transmission components, and
   at least one loop assembly which is embedded in an elastomer mass and has in the region between the at least two bushings at least two opposite, freely elastically deformable strands, each of the at least two opposite strands of the at least one loop assembly being formed in the region between the at least two bushings with at least one predetermined deformation, and in the event of a tensile loading the at least one predetermined deformation of the at least two opposite strands being elastically deformable in such a manner that the rigidity of the force transmission element progressively increases in the event of a tensile loading, the at least one loop assembly being held in a predetermined axial position on one of the bushings via at least two collar bushings, and the bushings and the collar bushings being embedded at least partly in the elastomer mass, the at least one predetermined deformation comprising a kink with a predetermined kink angle, and the opposite strands, surrounded with the elastomer mass, defining a cutout between them in the region between the bushings, and the rigidity of the force transmission element being determined by the elastomer mass and the kinks of the strands, wherein the cutout increases or decreases in parallel to the increase or the decrease of the distance between the opposite strands of the loop assembly such that the cutout increases or decreases starting from one of the bushings up to the kink of the strand and the cutout decreases or increases from the kink in the direction of the respective other bushing.

2. Elastic force transmission element according to claim 1, characterised in that the at least two opposite strands have at least one deformation such that, starting from one of the bushings, respectively, the distance between the strands of the loop assembly changes until a predetermined distance between the strands is set in one region.

3. Elastic force transmission element according to claim 2, characterised in that the maximum distance between the opposite strands of the at least one loop assembly is in the region of the predetermined distance.

4. Elastic force transmission element according to claim 2, characterised in that the minimum distance between the strands of the loop assembly is in the region of the predetermined distance.

5. Elastic force transmission element according to claim 1, characterised in that in a region of the predetermined deformation, in which at least two strands of the at least one loop assembly are at a maximum distance from each other, at least one pressure absorption device is arranged, the at least one pressure absorption device being designed in such a manner that the rigidity of the force transmission element progressively increases in the event of a tensile loading.

6. Elastic force transmission element according to claim 5, characterised in that the at least one pressure absorption device has at least one pressure element which extends, at least in portions, transversely to the longitudinal axis of the force transmission element.

7. Elastic force transmission element according to claim 6 characterised in that the at least one pressure element is formed integrally with the elastomer body of the force transmission element.

8. Elastic force transmission element according to claim 5 characterised in that the at least one pressure absorption device comprises at least one opening in the elastomer body, which opening is arranged between the at least one pressure element and at least one of the two strands of the loop assembly.

9. Elastic force transmission element according to claim 5 characterised in that the pressure absorption device has at least two pressure elements which bear against each other in the event of a tensile loading of the force transmission element.

10. Elastic force transmission element according to claim 1 characterised in that the at least two opposite strands in the region between the two bushings are, at least one location, at a distance from each other which is greater than the diameter of the bushings.

11. Elastic force transmission element according to claim 1 characterised in that the elastic force transmission element has at least two loop assemblies, the at least two loop assemblies being arranged and provided with a predetermined deformation in such a manner that the maximum distance between the strands of the one loop assembly and the strands of the other loop assembly is set in the axial direction of the bushings.

12. Elastic force transmission element according to claim 11, characterised in that the opposite strands of the at least two loop assemblies are provided in each case with a predetermined deformation in the axial direction of the bushings, the strands of the one loop assembly being deformed in a predetermined manner axially in the opposite direction to the strands of the respectively other loop assembly.

13. Elastic force transmission element according to claim 1 characterised in that the at least two opposite strands of the at least one loop assembly have in the region between the bushings in each case two sub-strands, the sub-strands being deformed oppositely to each other in the axial direction of the bushings.

14. Elastic force transmission device having at least two of the force transmission elements according to claim 1.

15. Coupling device for transmitting torques between two shaft portions,
    having a first flange, and
    a second flange,
    the first and the second flange being connected by the at least two force transmission elements, wherein the first and the second flange each have a plurality of fastening elements and a fastening element of the first flange and a fastening element of the second flange are connected to each other via in each case at least one force transmission element according to claim 14.

16. Coupling device for transmitting torques between two shaft portions,
    having a first flange, and
    a second flange,
    the first and the second flange each having a plurality of fastening elements and a fastening element of the first flange and a fastening element of the second flange being connected to each other via in each case at least one force transmission element according to claim 1.

17. Coupling device according to claim 16, characterised in that the first and/or the second flange have cutouts, into which the fastening elements of the respectively other flange project.

* * * * *